(12) United States Patent
Takahashi

(10) Patent No.: US 7,653,839 B2
(45) Date of Patent: Jan. 26, 2010

(54) IMAGE INPUT/OUTPUT DEVICE, INFORMATION PROCESSING METHOD, AND STORAGE MEDIUM

(75) Inventor: Toru Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 494 days.

(21) Appl. No.: 11/206,871

(22) Filed: Aug. 19, 2005

(65) Prior Publication Data

US 2006/0048019 A1  Mar. 2, 2006

(30) Foreign Application Priority Data

Aug. 26, 2004 (JP) .............................. 2004-246240

(51) Int. Cl.
*G06F 11/00* (2006.01)
(52) U.S. Cl. .......................................... 714/47; 714/20
(58) Field of Classification Search ................... 714/20, 714/47, 48
See application file for complete search history.

(56) References Cited

U.S. PATENT DOCUMENTS

| | | | | |
|---|---|---|---|---|
| 5,200,958 A | * | 4/1993 | Hamilton et al. ............... | 714/45 |
| 5,297,256 A | * | 3/1994 | Wolstenholme et al. ...... | 702/183 |
| 5,321,832 A | * | 6/1994 | Tanaka et al. ................ | 707/204 |
| 5,428,618 A | * | 6/1995 | Ueki et al. .................... | 717/124 |
| 5,469,463 A | * | 11/1995 | Polich et al. .................. | 714/20 |
| 5,533,193 A | * | 7/1996 | Roscoe ......................... | 714/39 |
| 5,630,048 A | * | 5/1997 | La Joie et al. ................. | 714/25 |
| 5,680,541 A | * | 10/1997 | Kurosu et al. ................. | 714/26 |
| 5,696,701 A | * | 12/1997 | Burgess et al. ................ | 714/25 |
| 5,706,470 A | * | 1/1998 | Okada ......................... | 711/161 |
| 5,740,490 A | * | 4/1998 | Yamashita et al. ............. | 399/8 |
| 5,828,583 A | * | 10/1998 | Bush et al. ................... | 702/185 |
| 6,023,775 A | * | 2/2000 | Fujii ........................... | 714/48 |
| 6,327,677 B1 | * | 12/2001 | Garg et al. .................... | 714/37 |
| 6,338,151 B1 | * | 1/2002 | Yudenfriend et al. .......... | 714/47 |
| 6,381,710 B1 | * | 4/2002 | Kim ............................ | 714/45 |
| 6,598,179 B1 | * | 7/2003 | Chirashnya et al. ........... | 714/37 |
| 6,604,212 B2 | * | 8/2003 | Sekizawa ..................... | 714/47 |
| 6,718,489 B1 | * | 4/2004 | Lee et al. ...................... | 714/43 |
| 6,718,490 B1 | * | 4/2004 | Takemoto et al. ............. | 714/47 |

(Continued)

FOREIGN PATENT DOCUMENTS

JP  2002-283683 A  3/2002

(Continued)

*Primary Examiner*—Robert Beausoliel
*Assistant Examiner*—Joshua P Lottich
(74) *Attorney, Agent, or Firm*—Fitzpatrick, Cella, Harper & Scinto

(57) ABSTRACT

An image input/output apparatus reduces unnecessary fault management processing load and prevents a normal image input/output processing efficiency from decreasing in the way that an administrator selects an intrinsic fault that should be emphasized among individually-occurring detectable faults. To accomplish this, when a history representing a state of control is stored as log information in a first storage, a fault is detected, and an occurrence frequency of the detected fault is stored in a second storage in a way that associates the fault occurrence frequency with the fault. One or more thresholds of the fault occurrence frequency are enabled to be set, and it is judged whether the fault occurrence frequency is equal to or larger than the threshold. Based on a result of the judgment, a log management unit controls storage setting of the log information associated with the fault into the first storage.

34 Claims, 12 Drawing Sheets

U.S. PATENT DOCUMENTS

| | | | |
|---|---|---|---|
| 6,754,854 B2* | 6/2004 | Kurrasch | 714/47 |
| 6,771,440 B2* | 8/2004 | Smith | 360/31 |
| 6,792,456 B1* | 9/2004 | Hellerstein et al. | 709/224 |
| 6,812,827 B2* | 11/2004 | Laskowsky et al. | 340/538.15 |
| 6,886,108 B2* | 4/2005 | Talagala | 714/5 |
| 7,000,154 B1* | 2/2006 | LeDuc et al. | 714/47 |
| 7,017,071 B2* | 3/2006 | Katayama et al. | 714/4 |
| 7,036,049 B2* | 4/2006 | Ali et al. | 714/47 |
| 7,051,099 B2* | 5/2006 | Ziegler et al. | 709/224 |
| 7,076,695 B2* | 7/2006 | McGee et al. | 714/47 |
| 7,080,294 B1* | 7/2006 | Weber | 714/704 |
| 7,107,491 B2* | 9/2006 | Graichen et al. | 714/37 |
| 7,139,940 B2* | 11/2006 | Arbeitman et al. | 714/57 |
| 7,165,190 B1* | 1/2007 | Srivastava et al. | 714/38 |
| 7,191,367 B2* | 3/2007 | Ito et al. | 714/47 |
| 7,225,368 B2* | 5/2007 | Lancaster | 714/48 |
| 7,251,750 B2* | 7/2007 | Oshima | 714/25 |
| 2002/0048112 A1* | 4/2002 | Chu et al. | 360/75 |
| 2003/0023714 A1* | 1/2003 | Ziegler et al. | 709/224 |
| 2003/0037287 A1* | 2/2003 | Nakamura et al. | 714/30 |
| 2003/0208654 A1* | 11/2003 | Krontz et al. | 710/312 |
| 2004/0181712 A1* | 9/2004 | Taniguchi et al. | 714/47 |
| 2005/0005206 A1* | 1/2005 | Popescu | 714/704 |
| 2005/0246590 A1* | 11/2005 | Lancaster | 714/47 |
| 2005/0246591 A1* | 11/2005 | Johnson et al. | 714/47 |
| 2006/0010352 A1* | 1/2006 | Mukherjee et al. | 714/47 |
| 2006/0230143 A1* | 10/2006 | Ziegler et al. | 709/224 |

FOREIGN PATENT DOCUMENTS

JP    2002-207399 A    7/2002

* cited by examiner

FIG. 2

| LOG ID | CONTENTS | RECORD FLAG |
|---|---|---|
| L001 | UI: START BUTTON DEPRESSION | 0 |
| L002 | UI: CANCEL BUTTON DEPRESSION | 0 |
| L003 | UI: " ↑ " BUTTON DEPRESSION | 1 |
| ⋮ | ⋮ | |
| L216 | PAPER TRAY 1: PAPER SENSOR VALUE | 1 |
| L217 | PAPER TRAY 1: TRAY SENSOR VALUE | 1 |
| ⋮ | ⋮ | |
| L569 | FIXING UNIT: HEATER TEMPERATURE | 0 |
| ⋮ | ⋮ | |
| L773 | Y TONER CARTRIDGE: LOADING/NO LOADING | 1 |
| L774 | Y TONER CARTRIDGE: TONER REMAINING AMOUNT | 1 |
| ⋮ | ⋮ | |

FIG. 3

DETECTABLE FAULTS

| FAULT ID | CONTENTS | FREQUENCY OF OCCURRENCE | | RELATED LOG ID | |
|---|---|---|---|---|---|
| | | NUMBER OF OCCURRENCE | LAST UPDATE TIME | LEVEL 1 | LEVEL 2 |
| E001 | POWER SOURCE ABNORMALITY | 0 | T_000013 | 5 L631, L632 | 10 L644, L645, L646 |
| ... | | | | | |
| E077 | DRUM: PAPER TRANSPORTATION ABNORMALITY | 16 | T_004119 | 15 L371, L372, L481 | 25 L244, L245 |
| E077 | DRUM: CHARGER ABNORMALITY | 2 | T_001072 | 8 L055 | 20 L056, L057, L111 |
| ... | | | | | |
| E552 | OUT OF Y TONER | 21 | T_037722 | 12 L773 | 18 L774 |
| ... | | | | | |

FIG. 5A [BEFORE FAULT OCCURS]
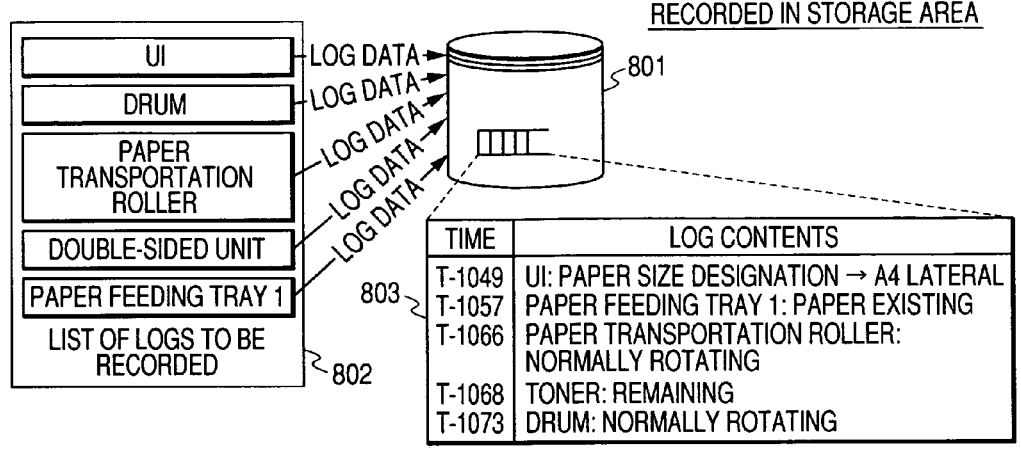
FIG. 5B [AT TIME WHEN FAULT OCCURS] EX. JAM
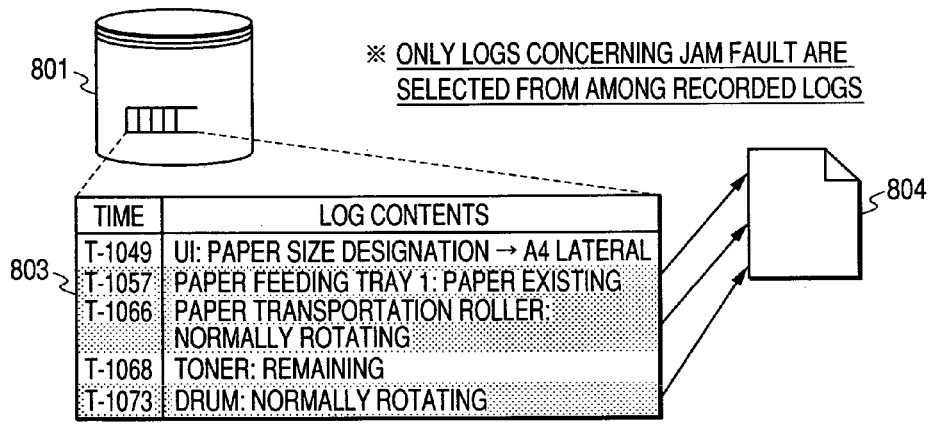
FIG. 5C [AFTER FAULT OCCURRED]
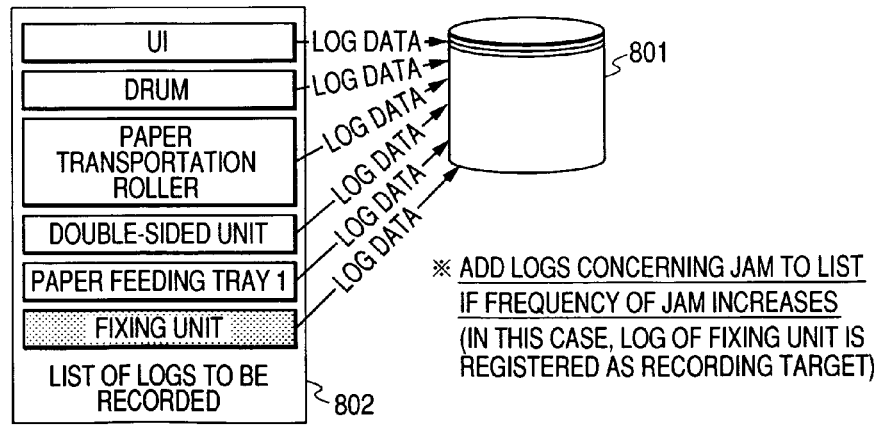

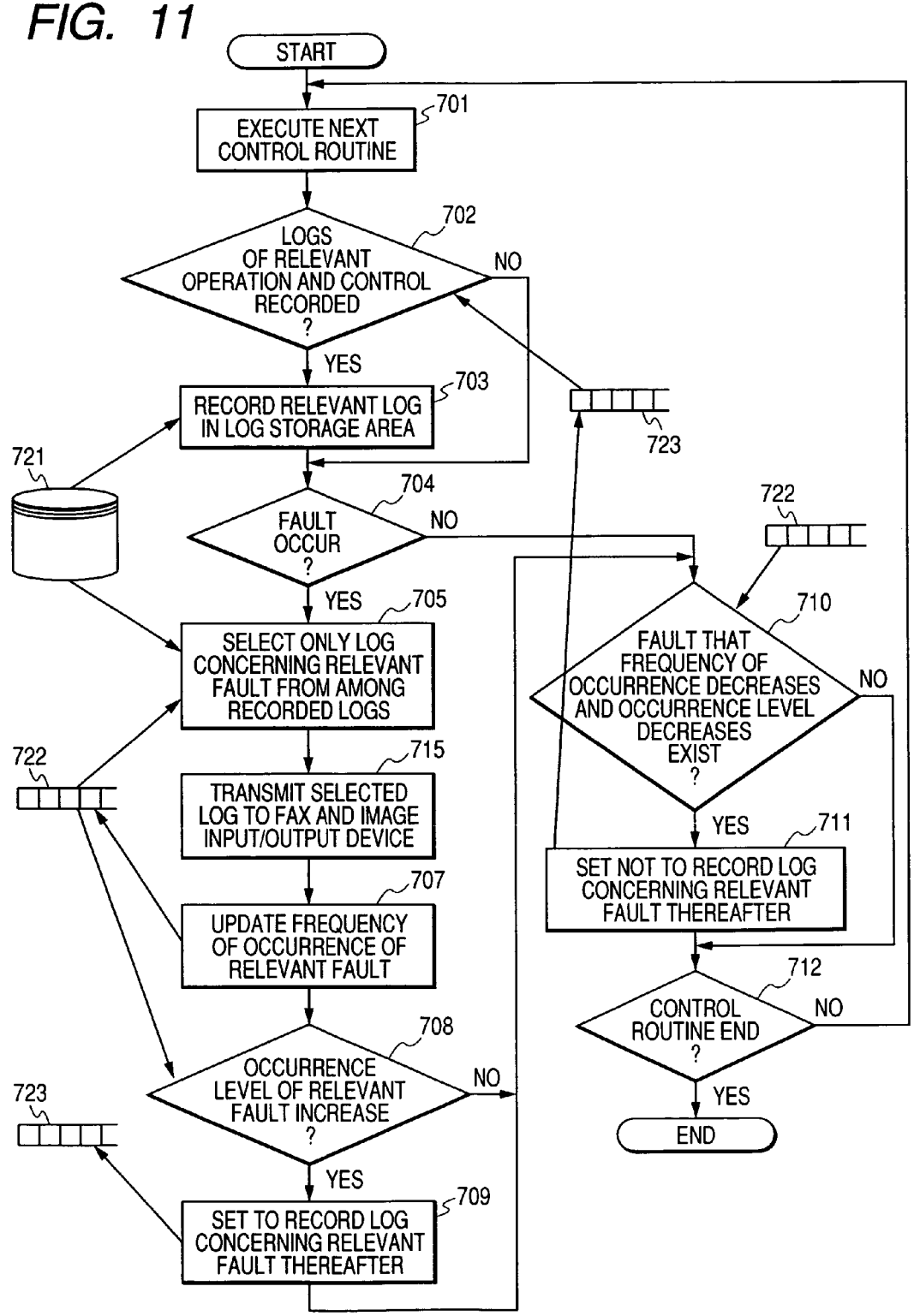

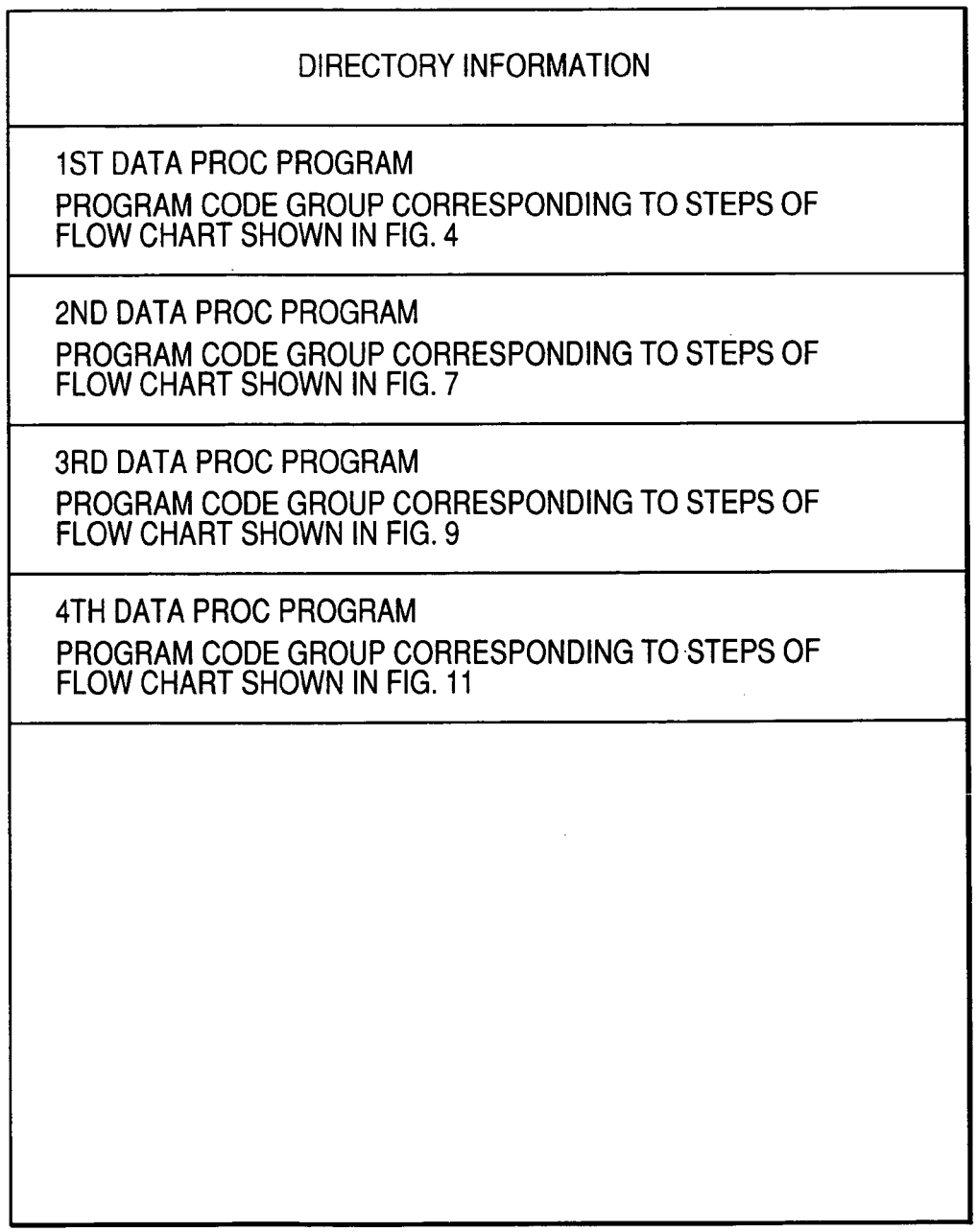

IMAGE INPUT/OUTPUT DEVICE, INFORMATION PROCESSING METHOD, AND STORAGE MEDIUM

FIELD OF THE INVENTION

The present invention relates to an image input/output device that executes a predetermined image input/output process by controlling a plurality of devices, an information processing method, and a storage medium storing a program readable by a computer to perform such method.

BACKGROUND OF THE INVENTION

A control unit for controlling executing operations of respective units (or modules) of a device configuring a multifunction device serving as a printer, a copying machine and a facsimile and incorporating functions thereof, has hitherto adopted a mechanism for outputting logs representing device internal states that include sensor values of the respective units in order to perform a test at a development and debugging, to conduct maintenance of a product on the market and to analyze a fault.

On the occasion of the product development, logs are invariably outputted to a host PC (Personal Computer) or the like connected to the device, and the development can be advanced while checking internal operations by analyzing these logs.

Then, for on-the-market machines, generally the logs are obtained only for periodic inspection by a serviceman and for taking urgent measures against a fault when such occurs. Therefore, what the periodic inspection can check is only a temporary state when in the inspection, and it is impossible to detect a latent fault that might not occur during the inspection.

Further, there is a possibility that when taking an urgent measure against a fault, the device internal state might already have changed, and the truly desired information, namely a picture of the machine state just when the fault occurs, cannot be acquired.

Moreover, the device internal state is merely left as a log while no consideration is given to a user's operation, and hence it is difficult to reenact an error and the fault when evaluating at the stage of the development and when taking the measure against the fault with respect to the on-the-market machine.

Such being the case, Japanese Patent Application Laid-Open No. 2002-283683 discloses a technology of enhancing the ability to reenact an error and a fault and facilitating the maintenance of the product and the fault analysis as well by recording the user's operation as a log in addition to the device internal state on a memory. Further, Japanese Patent Application Laid-Open No. 2002-283683 discloses also a technology of diagnosing the fault from these logs by the device itself.

According to the prior art described above, it is considered that the reenacting ability (i.e., the device's ability to reenact the error and the fault) and the reliability of self-diagnosis by the device are enhanced by taking as many detailed logs as possible.

As the number of logs gets larger, however, there is a higher possibility that the log recording process itself may restrict performance of execution of the normal control, that is, of the device's normal functions.

Further, it follows that logs unrelated to checking a target error and fault will increase in number, and therefore, conversely, it is difficult to select only the related logs from among these unrelated logs. In addition, the unrelated logs cause a futile expenditure of log storage area, and a period of real operation time of the device during which a history thereof can be recorded as a log, is reduced.

In these points, namely, a fundamental problem is that the recording target log is uniquely determined before the operation, but at that time it is not known which type of fault is going to occur during the operation or what the fault occurrence frequency is.

SUMMARY OF THE INVENTION

Accordingly, an object of the present invention is to provide an image input/output apparatus and an information processing method that are capable of setting without any restriction a threshold value for judging a fault occurrence frequency in adaptation to an environment where a user employs the image input/output apparatus. According to this apparatus and method, it is possible to perform fault information management having excellent usability, wherein an administrator selects a should-emphasize intrinsic fault from within detectable faults in individually-occurred faults, and it is enough to store a fault occurrence state. Hence, it is possible to reduce a futile fault management processing load and to prevent a normal image input/output processing efficiency from decreasing.

According to the present invention, the foregoing object is attained by providing an image input/output apparatus executing an image input/output process by controlling at least one device comprising a controlling unit adapted to control an operation of said device, a first storing unit adapted to store a history as log information showing a state of the control by said controlling unit, a fault detecting unit adapted to detect a fault of said device, a second storing unit adapted to store an occurrence frequency of the fault detected by said fault detecting unit in a way that associates the occurrence frequency with the fault, a setting unit adapted to enable one or more threshold values of the occurrence frequency to be set, a discriminating unit adapted to judge whether or not the occurrence frequency of the fault is equal to or larger than the threshold value, and a log management unit adapted to control storage setting of the log information associated with said fault into said first storing unit on the basis of a result of the judgment by said discriminating unit.

Further, an image input/output apparatus comprises a controlling unit adapted to control an operation of said device, a first storing unit adapted to store a history as log information showing a state of the control by said controlling unit, a fault detecting unit adapted to detect a fault of said device, a second storing unit adapted to store an occurrence frequency of the fault detected by said fault detecting unit in a way that associates the occurrence frequency with the fault, a setting unit adapted to enable one or more threshold values of the occurrence frequency to be set, and a log management unit adapted to control, if the fault occurrence frequency is equal to or larger than the threshold value, the log information associated with the fault so that the log information is stored on said first storing unit.

Yet further, an image input/output apparatus comprises a controlling unit adapted to control an operation of said device, a first storing unit adapted to store a history as log information showing a state of the control by said controlling unit, a fault detecting unit adapted to detect a fault of said device, a second storing unit adapted to store an occurrence frequency of the fault detected by said fault detecting unit in a way that associates the occurrence frequency with the fault, a setting unit adapted to enable one or more threshold values of the occurrence frequency to be set, and a log management unit adapted to control, if the fault occurrence frequency is less than the threshold value, the log information associated with the fault so that the log information is not stored on said first storing unit.

Other features and advantages of the present invention will be apparent from the following description taken in conjunction with the accompanying drawings, in which like reference characters designate the same or similar parts throughout the figures there.

BRIEF DESCRIPTION OF THE DRAWING

FIG. 2 is an explanatory diagram showing a data structure in a log management table shown in FIG. 1;

FIG. 3 is an explanatory diagram showing a data structure in the log management table shown in FIG. 1;

FIGS. 5A, 5B and 5C are explanatory schematic diagrams showing a history recording process into a log storage area by a log management module shown in FIG. 1;

FIG. 11 is a flowchart showing one example of a fourth data processing procedure in the image input/output device in the fourth embodiment of the present invention; and FIG. 12 is an explanatory diagram showing a memory map of a storage medium stored with a variety of data processing programs readable by the image input/output device according to the present invention.

DETAILED DESCRIPTION OF THE PREFERRED EMBODIMENTS

The preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Description of System Architecture

First Embodiment

Figure 1:
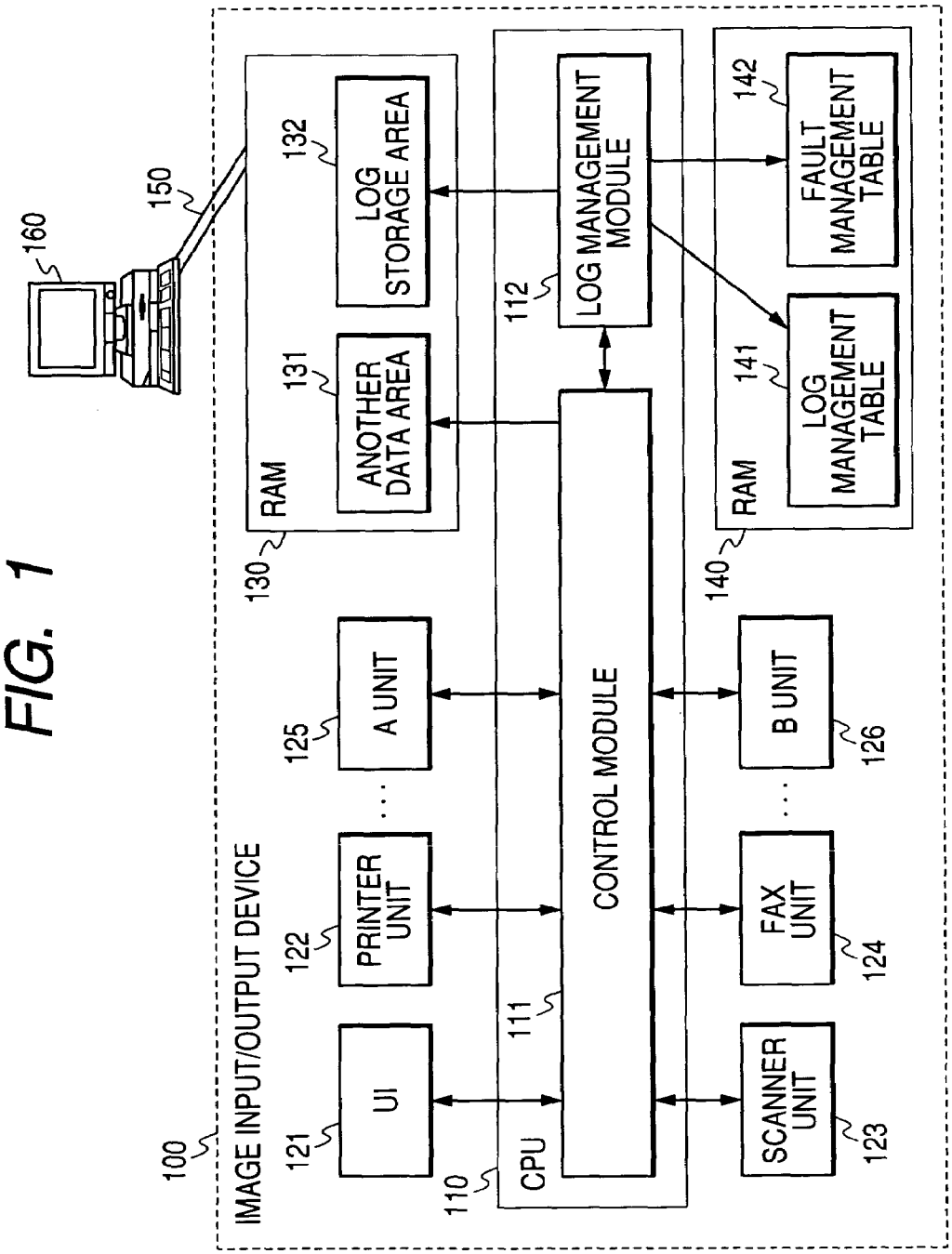
FIG. 1 is an explanatory block diagram showing a system architecture of an image input/output device in a first embodiment of the present invention.

FIG. 1 is an explanatory block diagram showing a system architecture of an image input/output device in one embodiment of the present invention.

An image input/output device 100 shown in FIG. 1 is constructed of a CPU (Central Processing Unit) 110, a RAM (Random Access Memory) 130, a RAM 140, a UI (User Interface) 121, a printer unit 122, a scanner unit 123, a FAX unit 124 and other units (an A-unit 125, a B-unit 126, etc.).

The CPU 110 executes a program consisting of a control module 111 and a log management module 112. The control module 111 controls executing operations of the respective units connected to the CPU 110 in a way that employs a data area 131 in the RAM 130 stored with attributes of a print job and printing object image data.

On the other hand, the log management module 112 receives sensor output signals from various types (including electrical or mechanical types) sensors (functioning as fault detection means) provided in the respective units and logs representing a variety of states of the control of the control module 111, and stores the logs in a log storage area 132 within the RAM 130.

Further, the log management module 112 manages setting of storing or not storing, for each log on the log storage area 132, by use of a log management table 141 in the RAM 140, and manages information on the frequency of occurrence of each fault by use of a fault management table 142 within the RAM 140.

A configuration at this time shall be such that the RAM 130 and the RAM 140 may be actualized as a single RAM. Further, two or more RAMs may also exist, and one or another of the RAMs must include the data area 131, the log storage area 132, the log management table 141 and the fault management table 142.

The UI 121 includes an input/output device such as a liquid crystal panel and buttons, and controls an input from a user and an output to the user. The printer unit 122 prints the image data on a paper medium. The scanner unit 123 reads an original as the image data. The FAX unit 124 transmits the image data via a public network to other devices, and receives the image data from other devices. For others, the units (the A-unit 125, the B-unit 126, etc.) controlled by the control module 111 are connected to the CPU 110.

A local PC 160 functioning as an external device is so connected via a connection medium 150 as to get communicable, and can receive the log stored in the log storage area 132 via the connection medium 150. Note that a serial cable such as a USB (Universal Serial Bus) is given as one example of the connection medium 150.

It should be noted that the local PC 160 receives only a necessary piece of fault-related log transmitted form the image input/output device 100 in step (706) shown in FIG. 4 as will be described later on, and displays notification on an unillustrated UI screen, whereby a user thereof recognizes occurrence of the fault and starts a quick and exact measure against the fault occurred on the image input/output device.

FIG. 2 is an explanatory diagram showing a data structure in the log management table shown in FIG. 1.

Referring to FIG. 2, a log management table 500 is structured of three items (fields) such as a log ID 501, a content 502 and a record flag 503.

The log ID 501 serves to identify a type of the log, and contains ID entries corresponding to the number of log types. The log content 502 represents a content of each of the logs. The record flag 503 is a flag for setting whether the log content 502 is recorded in the log storage area 132 or not, wherein, in the first embodiment, when a value in the record flag 503 is "0", this value corresponds to a setting status of "not recording", and, when the value in the record flag 503 is "1", this value corresponds to a setting status of "recording".

Note that the record flag 503 enables the value to become changeable during an operation of the device, corresponding to the frequency of occurrence of the fault occurred within the image input/output device 100 in the first embodiment.

Further, the log ID 501 and the content 502 are not information that should be changed during the operation and are not therefore permitted to change during the operation; however, a pre-registration, a pre-change and a pre-deletion thereof can be conducted.

FIG. 3 is an explanatory diagram showing a data structure in the fault management table 142 shown in FIG. 1.

Referring to FIG. 3, a fault management table 600 is structured of four items (fields) such as a fault ID 601, a content 602, a frequency of occurrence and a related log ID.

The fault ID 601, which serves to identify a type of the fault, differs depending on the components of the image input/output device 100, and contains ID entries corresponding to the number of types of the faults that occur, depending on a hardware architecture and a module configuration of each image input/output device. The content 602 represents a content of the fault.

On the other hand, the frequency of occurrence consists of items (sub-fields) such as a number-of-occurrence (occurrence count) 603 and a last update time 604. The number-of-occurrence 603 represents the number of occurrences of the faults, and the last update time 604 represents the latest time when updating (a value in) the number-of-occurrence (occurrence count) 603.

If any one type of fault manageable (identifiable) by the fault ID occurs, a value in the fault occurrence count 603 is incremented under the control of the log management module 112, and the time when incrementing this value is set in the last update time 604 in the fault management table 600.

Further, if any fault does not occur for a predetermined period as a result of comparing the last update time 604 with time when in operation (which is acquired from, e.g., an RTC (Real Time Clock) etc., the value in the occurrence count 604 is decremented under the control of the log management module 112, and the decremented time is set in the last update time 604 in the fault management table 600. Note that at this time the occurrence count 604 is reduced to "0" but does not become less than "0".

The related log ID consists of items (sub-fields) such as a Level 1 and a Level 2.

The Level 1 and the Level 2 represent fault occurrence levels, and the level transits such as the Level 1, the Level 2 in sequence as the occurrence frequency rises. The transition of the occurrence level is controlled by the log management module 112 so that the level transits to a high-order level when the value in the occurrence count 603 gets equal to or larger than a threshold value based on the setting that will be explained later on, and transits to a low-order level when becoming smaller than the threshold value.

Note that each of the Level 1 and the Level 2 has two items, wherein the aforementioned threshold values are set in items 605 and 607, and identification values (the values in the log ID 501 in the log management table 500) of the types of the logs related to the respective faults, are set in items 606 and 608.

More detailed logs with respect to the faults each exhibiting a high occurrence frequency and a high level of importance can be recorded in a way that manages the log management table 500 and the fault management table 600.

Conversely, the setting with respect to the faults that exhibit a low occurrence frequency and a low level of importance, can be set as not recording the related logs. A specific description about the log management table 500 and the fault management table 600 will hereinafter be explained, and therefore, for example, exhaustion of a color (Y) toner as a consumable material in an engine portion of the printer unit 122 of the image input/output device 100 is emphatically described as "out of Y toner" in an example of the fault.

As shown in FIG. 3, the fault "out of Y toner" is that "E552" is entered in the fault ID 601, the occurrence count 603 is counted up under the control of the log management module 112 from a point of time "T_037722" entered in the last update time 604, wherein it can be recognized by referring to the contents in the fault management table 142 that the occurrence count is 21 as a total sum.

Further, the occurrence count 603 is equal to or larger than "18" defined as a value in the item 607 of the Level 2 of the related log ID, and hence it can be also simultaneously recognized by referring to the contents in the fault management table 142 that the fault occurrence level is Level 2.

Accordingly, the setting under the control of the log management module 112 is that the fault of "out of Y toner" and logs "L773" and "L774" which are associated as the sub-items of the occurrence levels of the fault, are recorded in the log storage area 132 ensured in the RAM 130.

To be specific, as shown in FIG. 2, both of values, in the record flag 503, of "L773" and "L774" as the values in the log ID 501 are set to "1".

From this state, when the occurrence frequency of "out of Y tone" decreases and when the occurrence count becomes smaller than the value ([18]) in the item 607, the fault occurrence level transits to Level 1 from Level 2, wherein the log ("L774" in the first embodiment) associated with the higher-order occurrence level than Level 1 is set so as not to be recorded in the log storage area 132, and the value in the record flag 503 is set to "0".

Then, if the occurrence count 603 gets smaller than the threshold value of Level 1, similarly the value, in the record flag 503, of the log associated with Level 1 is set to "0". Namely, if the occurrence count 603 is smaller than the threshold value of Level 1, the control is that none of the logs related to this fault are recorded.

For instance, an assumption shall be such that the fault occurs once, after removing this fault, the same fault does not occur for one year or longer, and the occurrence count returns to "0". In this case, it follows that none of the related logs are recorded because of not exceeding any threshold values. In this case, however, the frequency of the fault occurrence is extremely small, and it can be therefore considered that no analysis of the log does not cause trouble so much.

While on the other hand, it shall be assumed that the occurrence count comes to "50" where the fault occurs 50 times in, e.g., one month in spite of getting rid of the fault each time the fault occurs, and all the related logs are to be recorded. In this case, the fault can be considered to exhibit a level of importance high enough to require the analyses of all the related logs.

In the above, the setting of the value in the record flag 503 is determined depending on whether the value is equal to or larger than the threshold value or less than the threshold value. It is taken for, however, granted that the setting of the value in the record flag 503 may be determined depending on whether the value is larger than the threshold value or equal to or smaller than the threshold value.

The thus-constructed image input/output device 10 has the following characteristic configurations.

In the image input/output device 100, when giving, e.g., an image processing request through an operation panel configuring the UI 121 shown in FIG. 1, the CPU 110 controls the plurality of devices (the scanner unit 123, the FAX unit 124, the printer unit 122, etc.) by executing the control module 111.

Further, on this occasion, the log management table 141 illustrated in FIG. 1, which serves as first storage means (a first storing unit), is stored with operation history information (logs) classified, as shown in FIG. 2, into a first type of history representing an operation on the UI 121 and a second type of history representing a state of the control by the control module 111 and with a record flag 503 for selecting from the first type of history or the second type of history as shown in FIG. 2.

Moreover, the variety of unillustrated sensors are installed in predetermined positions within the image input/output device and detect the faults of the respective devices that operate under the control of the control module 111, and outputs thereof are inputted to an unillustrated input port of the CPU 110. Then, the fault management table 142 shown in FIG. 1, which serves as second storage means (a second storing unit), is stored with pieces of fault history information such as every fault to be detected, a fault occurrence frequency of every fault and a threshold value for judging a fault occurrence level of the occurrence frequency by associating these elements with each other in a way that enables the fault history information to be updated.

Further, when one or more threshold values stored in the fault management table 142 are set and when the fault occurrence level is set through the UI 121, these threshold values are set at two or more levels in the fault management table 142.

Then, the log management module 112 shown in FIG. 1 judges a fluctuation state of the fault occurrence level on the basis of a procedure shown in FIG. 4 that will be explained later on by judging whether or not the occurrence frequency of each fault stored in the fault management table 142 exceeds each threshold value to be set. Then, the value in the record flag stored in the log management table 141 is control-set to "0" or "1" on the basis of a result of the judgment about the fluctuation state of the fault occurrence level.

Through this procedure, an administrator or the like selects a should-emphasize characteristic fault from the individually-occurred and detectable faults by setting without any restriction the threshold value for judging the level of the fault occurrence frequency in adaptation to an environment in which the user employs the image input/output device, thereby making it possible to reduce a futile fault management processing load and to prevent a normal image input/output processing efficiency from decreasing because of it's being enough to store the fault occurrence state.

Figure 4:
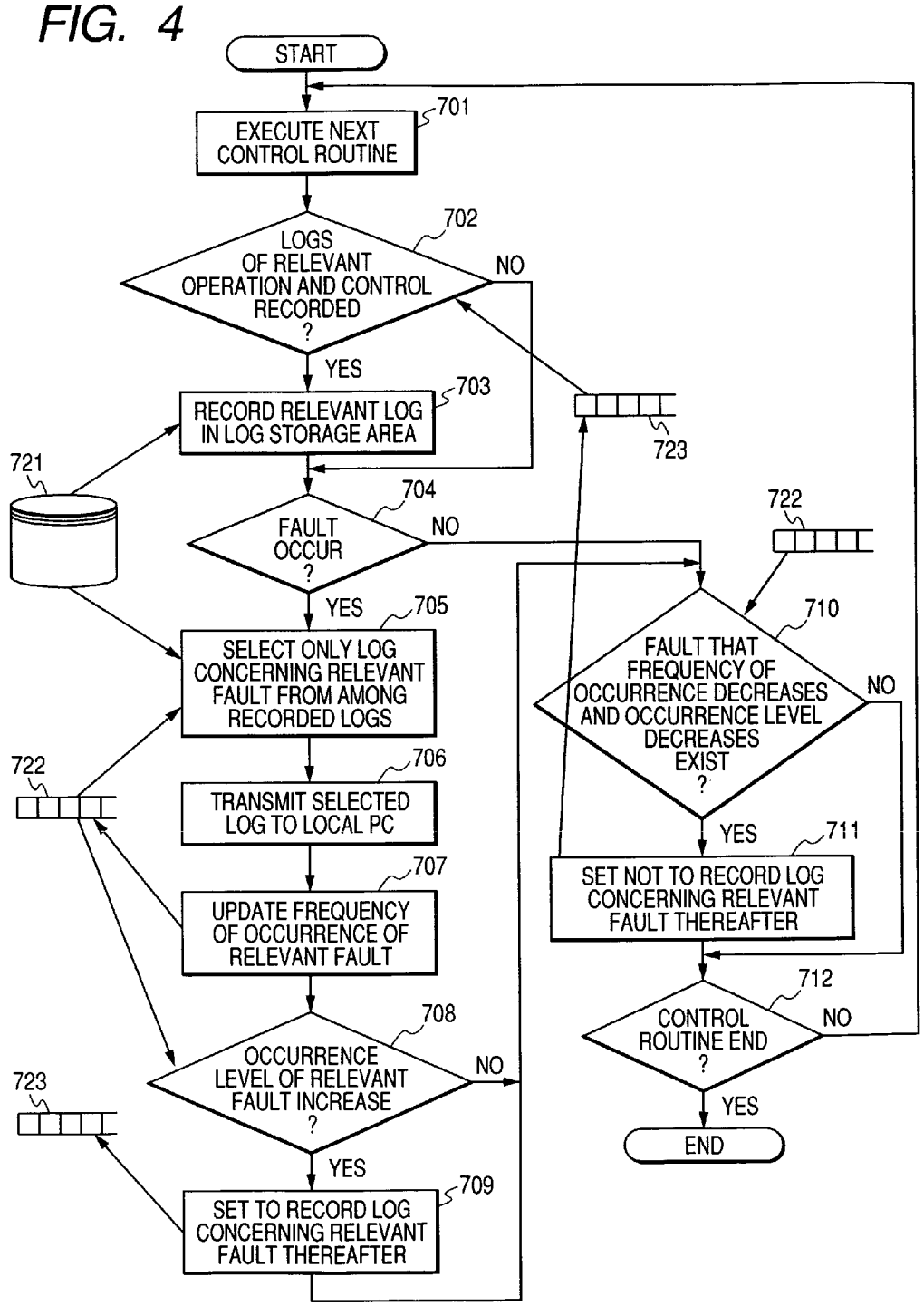
FIG. 4 is a flowchart showing one example of a first data processing procedure in the image input/output device in the first embodiment of the present invention.

FIG. 4 is a flowchart showing one example of a first data processing procedure in the image input output device according to the present invention.

The log management module 112 shown in FIG. 1 corresponds to a history recording processing procedure into the log storage area 132, which is executed in a way that refers to the fault management table 142. Note that (701) to (712) represent respective steps. Further, the CPU 110 shown in FIG. 1 executes the log management module 122, thereby actualizing the respective steps.

Moreover, in FIG. 4, a log storage area 721 corresponds to the log storage area 132 shown in FIG. 1, a log management table 723 corresponds to the log management table 141, and a fault management table 722 corresponds to the fault management table 142.

FIGS. 5A, 5B and 5C are explanatory schematic diagrams each showing a history recording process into the log storage area 132, which is executed by the log management module 112 shown in FIG. 1, wherein FIG. 5A corresponds to (shows) a state before the fault occurs, FIG. 5B corresponds to a state when the fault occurs, and FIG. 5C corresponds to a state after the fault has occurred.

Throughout FIGS. 5A to 5C, a log storage area 801 corresponds to the log storage area 132 shown in FIG. 1.

To start with, in FIG. 4, when the image input/output device 100 illustrated in FIG. 1 operates, the user inputs the operational instruction or a print job, etc., whereby control routines corresponding to these events (user's inputs) in the control module 111 are consecutively executed (701).

Then, the log management module 112 judges on a control-routine-by-control-routine basis whether the logs about the user's instructive operation inputted and the control itself are recorded or not (702). The log management module 112 makes this judgment by referring to the log management table 723, and specifically the judgment is conducted based on which value, "0" or "1", is set in the record flag 503 shown in FIG. 2 as described above.

Figure 7:
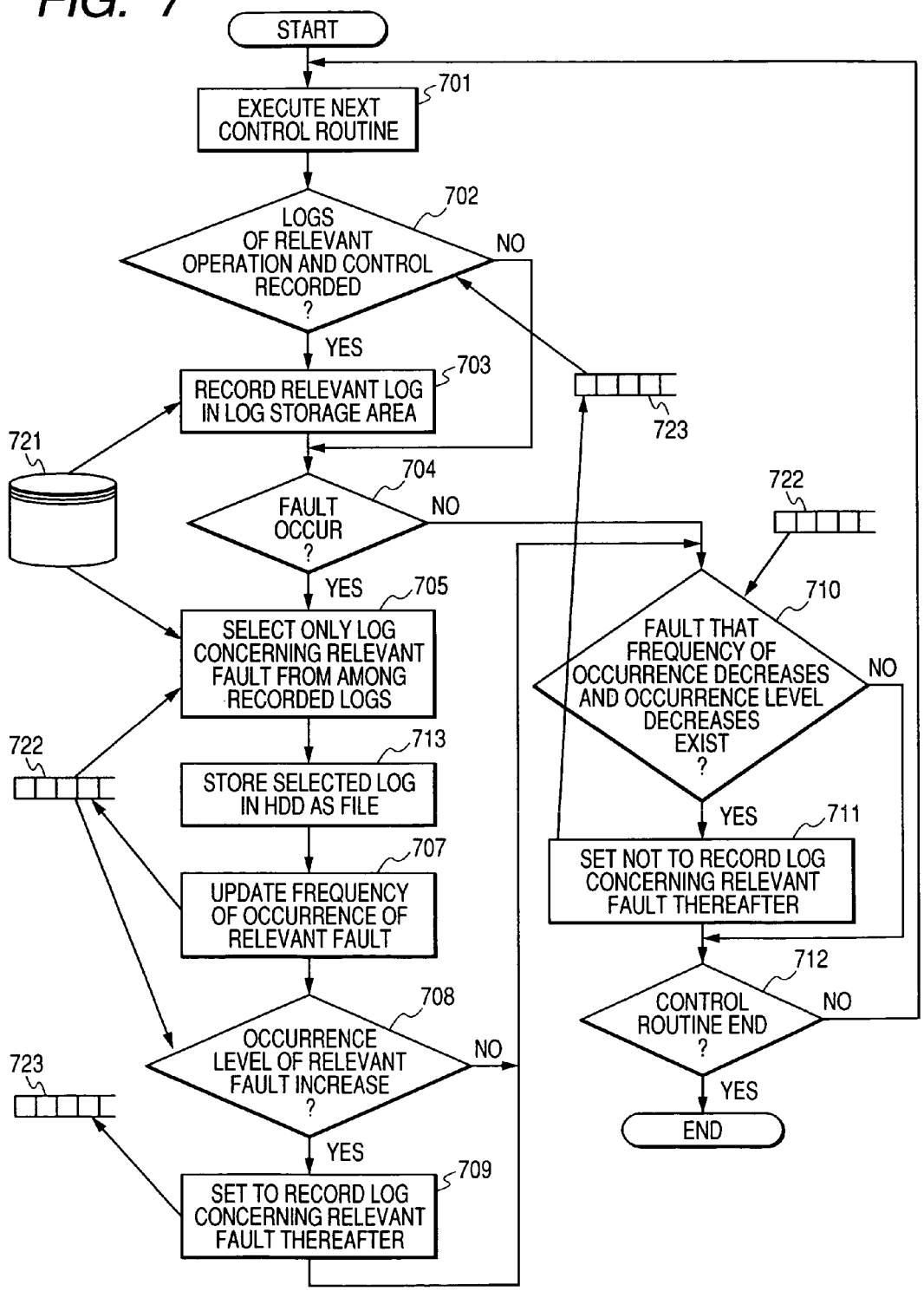
FIG. 7 is a flowchart showing one example of a second data processing procedure in the image input/output device in the second embodiment of the present invention.

Then, in the first embodiment, in the case of recording the operation logs or the control logs, namely, in the case where the value in the concerned record flag 503 is "1", as shown in FIG. 7, the logs concerned are consecutively recorded in the log storage area 721 (703). A data flow in the processing flow described above corresponds to the state before the fault occurs as shown in FIG. 5A, and a log list 802 of the logs to be recorded is expressed as a list of the operation logs or the control logs in which the value in the record flag 503 shown in FIG. 2 is "1".

Then, the logs existing in the list 802 are, when subjected to the operation and the control by the log management module 112, invariably recorded in the log storage area 801. Note that 803 in FIGS. 5A to 5C shows one example of the logs recorded in the log storage area 801. Further, the log contents are recorded in the log 803 in a way that adds (associates) the time to (with) each log entry.

Next, it is judged in the control routine whether the fault occurs or not (704), and, when judging that the fault does not occur, the processing advances to step (710), wherein when judging that the fault occurs, only the logs related to the fault are selected from within the logs recorded so far in the log storage area 721 (705).

It is to be noted that judgment about whether or not the logs recorded in the log storage area 721 are related to the fault concerned is conducted by the log management module 112 in a way that refers to the fault management table 722. To be specific, as shown in FIG. 3, the management information about the fault is specified by the fault ID 601, then only the logs specified by the log ID 501, which are registered in the items 606 and 608 of the related log ID, are selected, and the selected logs are transmitted to the local PC 160 shown in FIG. 1 (706).

Further, when it is judged in step (704) that a fault occurs, as at the fault occurrence time (as in the example of "jam" given by way of one example of the occurred fault) shown in FIG. 5A, in the case of the occurrence of the fault called "jam", among the logs recorded in the log storage area 801, only the jam-related logs (the logs with half-tone dot meshing in FIG. 5B) shown in FIG. 5B are selected. Then, the logs selected due to the occurrence of the fault are stored as a log file 804.

Thereafter, the occurrence count associated with the concerned fault and representing the occurrence frequency in the fault management table 722 is updated by incrementing the value in the occurrence count (707).

Specifically, the occurrence count 603 in the occurrence frequency shown in FIG. 3 and the value in the last update time 604 are updated while referring to the fault management table 722.

Then, at this time, the log management module 112 judges whether the fault occurrence level rises or not by comparing the value in the occurrence count 603 of the concerned fault with the values in the item 605 of the Level 1 and the value in the item 607 of the Level 2 of the related log ID (708), then the processing advances to step (710) when it is judged that the fault occurrence level does not rise, and, when it is judged that the occurrence count 603 gets larger than the threshold value (the item 605 of the Level 1 or the item 607 of the Level 2 shown in FIG. 3) of the high-order level and the fault occurrence level transits to the high-order level, the setting is done so as to record the fault-related logs from this point onwards (709).

To be specific, the setting is done so that the log management module 112 refers to the log management table 723 and records the logs specified by the related log ID (the item 605 of the Level 1 or the item 607 of the Level 2 shown in FIG. 3) described in the occurrence level concerned. With this setting, the value in the record flag 503 in the log management table 723 is set to "1".

Through steps (707)-(709) given above, as shown in FIG. 5C corresponding to the state after the occurrence of the fault, the occurrence level of the fault called, e.g., "jam" rises to "1" from "0]", and the setting is such that a log of a fixing unit related to the "jam" is recorded in the log storage area 132.

Then, with respect to all the faults registered in the fault management table 142, the log management module 112 judges whether there is a fault exhibiting a decrease in the fault frequency and a decrease in the fault occurrence level (710).

Specifically, as shown in FIG. 3, the present time is compared with the last update time 604, and, with respect to the fault with the update that is not executed for a predetermined period of time, the value in the occurrence count 603 is decremented while updating the last update time 604, whereby the fault frequency decreases. At this time, it is judged whether or not the occurrence count 603 is smaller than the threshold value (the item 605 of the Level 1 or the item 607 of the Level 2 shown in FIG. 3) of the present occurrence level.

Then, if the judgment made in step (710) is that there is the fault exhibiting the decrease in the fault occurrence level, the setting is done so that the fault-related log is not recorded from this onwards (711). Namely, "0" is set in the record flag 503 in the log management table 723. Then, in the case of making a control routine terminating judgment (712) and judging that the control routine is terminated, the present process is finished, then, while on the other hand, when judging that the routine is not terminated, the processing returns to step (701), and the next control routine is executed again during the operation (701), thus repeating the flow described above.

With this processing, the local PC 160 receives only necessary pieces of fault-related logs transmitted from the image input/output device 100 in step (706) shown in FIG. 4 and displays these logs by way of notification on the UI screen (not shown), and the user recognizes the occurrence of the fault and starts a measure against the fault occurred on the image input/output device quickly and exactly.

Moreover, on the fault management table 600, there is exactly grasped a fault occurrence fluctuation state (which differs depending on a user's specification mode of the image input/output device 100) in a case where the related log rises from the item 605 of the Level 1 up to the item 607 of the Level 2 shown in FIG. 3 in accordance with the to-be-set threshold values of the occurrence frequencies of, e.g., the two faults and in a case where the related log decreases from the item 607 of the Level 2 down to the item 605 of the Level 1 shown in FIG. 3, and the record management of the fault logs can be performed by the short-time processing with a small memory capacity without interfering with the execution of other control modules because of it's being enough merely to record the minimum number of fault logs required in the log storage area 132.

Second Embodiment

The first embodiment has exemplified the case of grasping the timing of recording the fault log in the log storage area 132 and notifying the local PC 160 of the content thereof, however, an available configuration is that the logs with the fault occurred are accumulated on the storage device, e.g., the hard disc, etc., included in the image input/output device, and the contents thereof can be displayed and thus confirmed on the UI screen by the instruction from the operation unit, etc. The embodiment thereof will hereinafter be described.

Figure 6:
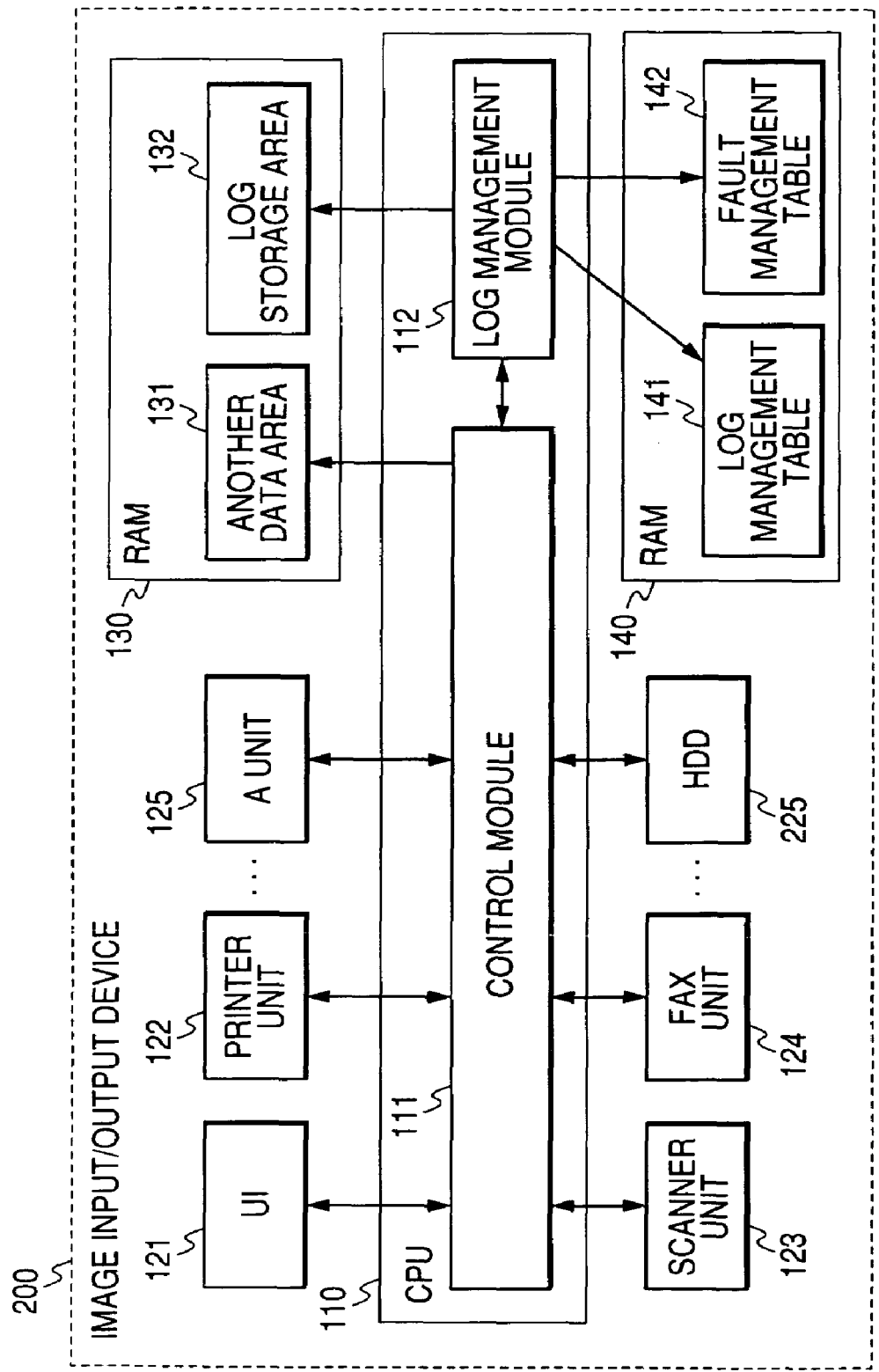
FIG. 6 is an explanatory block diagram showing a system architecture of the input input/output device in a second embodiment of the present invention.

FIG. 6 is an explanatory block diagram showing a system architecture of the image input/output device in a second embodiment of the present invention, wherein the same components as those in FIG. 1 are marked with the same numerals and symbols.

Referring to FIG. 6, a hard disc (HDD) designated at 225 is stored with the image data etc. as a file. Further, in an image input/output device 200 having the HDD 225, when detecting the occurrence of the fault, only the fault-related logs are extracted (selected) from the log storage area 132 in a way that selects only the fault-related logs under the control conducted by the log management module 112 by referring to the fault management table 142, and there is performed the control of storing these selected logs as a text file on the HDD 225.

FIG. 7 is a flowchart showing one example of a second data processing procedure in the image input/output device according to the present invention, and this processing procedure corresponds to the history record processing procedure of recording into the log storage area 132, which is executed by the log management module 112 shown in FIG. 6 while referring to the fault management table 142. Note that (701)-(705) and (707)-(713) represent respective steps. Moreover, the CPU 110 shown in FIG. 6 executes the log management module 112, thereby actualizing these steps.

Furthermore, in FIG. 7, a log storage area 721 corresponds to the log storage area 132 shown in FIG. 6, a log management table 723 corresponds to the log management table 141, and a fault management table 722 corresponds to the fault management table 142.

FIGS. 5A, 5B and 5C are explanatory schematic diagrams each showing a history recording process into the log storage area 132, which is executed by the log management module 112 shown in FIG. 6, wherein FIG. 5A corresponds to (shows) a state before the fault occurs, FIG. 5B corresponds to a state when the fault occurs, and FIG. 5C corresponds to a state after the fault has occurred.

Throughout FIGS. 5A to 5C, a log storage area 801 corresponds to the log storage area 132 shown in FIG. 1.

To begin with, when the image input/output device 200 illustrated in FIG. 6 operates, the user inputs the operational instruction or a print job, etc., whereby control routines corresponding to these events (user's inputs) in the control module 111 are consecutively executed (701).

Then, the log management module 112 judges on the control-routine-by-control-routine basis whether the logs about the user's instructive operation inputted and the control itself are recorded or not (702). The log management module 112 makes this judgment by referring to the log management table 723, and specifically the judgment is conducted based on which value, "0" or "1", is set in the record flag 503 shown in FIG. 2 as described above.

Then, in the second embodiment, in the case of recording the operation logs or the control logs, namely, in the case where the value in the concerned record flag 503 is "1", as shown in FIG. 7, the logs concerned are consecutively recorded in the log storage area 721 (703). A data flow in the processing flow described above corresponds to the state before the fault occurs as shown in FIG. 5A, and a log list 802 of the logs to be recorded is expressed as a list of the operation logs or the control logs in which the value in the record flag 503 shown in FIG. 2 is "1".

Then, the logs existing in the list 802 are, when subjected to the operation and the control by the log management module 112, invariably recorded in the log storage area 801. Note that 803 in FIGS. 5A to 5C shows one example of the logs recorded in the log storage area 801. Further, the log contents are recorded in the log 803 in a way that adds (associates) the time to (with) each log content.

Next, it is judged in the control routine whether the fault occurs or not (704), and, when it is judged that the fault does not occur, the processing advances to step (710), wherein when it is judged that the fault occurs, only the logs related to the fault are selected from within the logs recorded so far in the log storage area 721 (705).

It is to be noted that judgment about whether or not the logs recorded in the log storage area 721 are related to the fault concerned is conducted by the log management module 112 in a way that refers to the fault management table 722. To be specific, as shown in FIG. 3, the management information about the fault is specified by the fault ID 601, then only the logs specified by the log ID 501, which are registered in the items 606 and 608 of the related log ID, are selected, and the selected logs are stored as a file on the hard disc 225 shown in FIG. 6 (713). Hereafter, the operation is the same as steps shown in FIG. 4, and hence their explanations are omitted.

With this processing, the hard disc 225 is stored with necessary pieces of logs related to the fault in step (713) shown in FIG. 7, then these logs are displayed by way of notification on the UI screen (not shown), and the user recognizes the occurrence of the fault and starts a measure against the fault occurred on the image input/output device quickly and exactly.

Moreover, on the fault management table 600, there is exactly grasped a fault occurrence fluctuation state (which differs depending on a user's specification mode of the image input/output device 200) in a case where the related log rises from the item 605 of the Level 1 up to the item 607 of the Level 2 shown in FIG. 3 in accordance with the to-be-set threshold values of the occurrence frequencies of, e.g., the two faults and in a case where the related log decreases from the item 607 of the Level 2 down to the item 605 of the Level 1 shown in FIG. 3, and the record management of the fault logs can be performed by the short-time processing with a small memory capacity without interfering with the execution of other control modules because of it's being enough merely to record the minimum number of fault logs required in the log storage area 132.

Third Embodiment

The first embodiment has exemplified the case of grasping the timing of recording the fault log in the log storage area 132 and notifying the local PC 160 of the content thereof; however, an available configuration is that the logs with the fault occurred are transmitted to the PC and the management server via the network, and the contents of the logs can be displayed and confirmed on the UI screen by an instruction from the operation unit, etc. An embodiment thereof will hereinafter be described.

Figure 8:
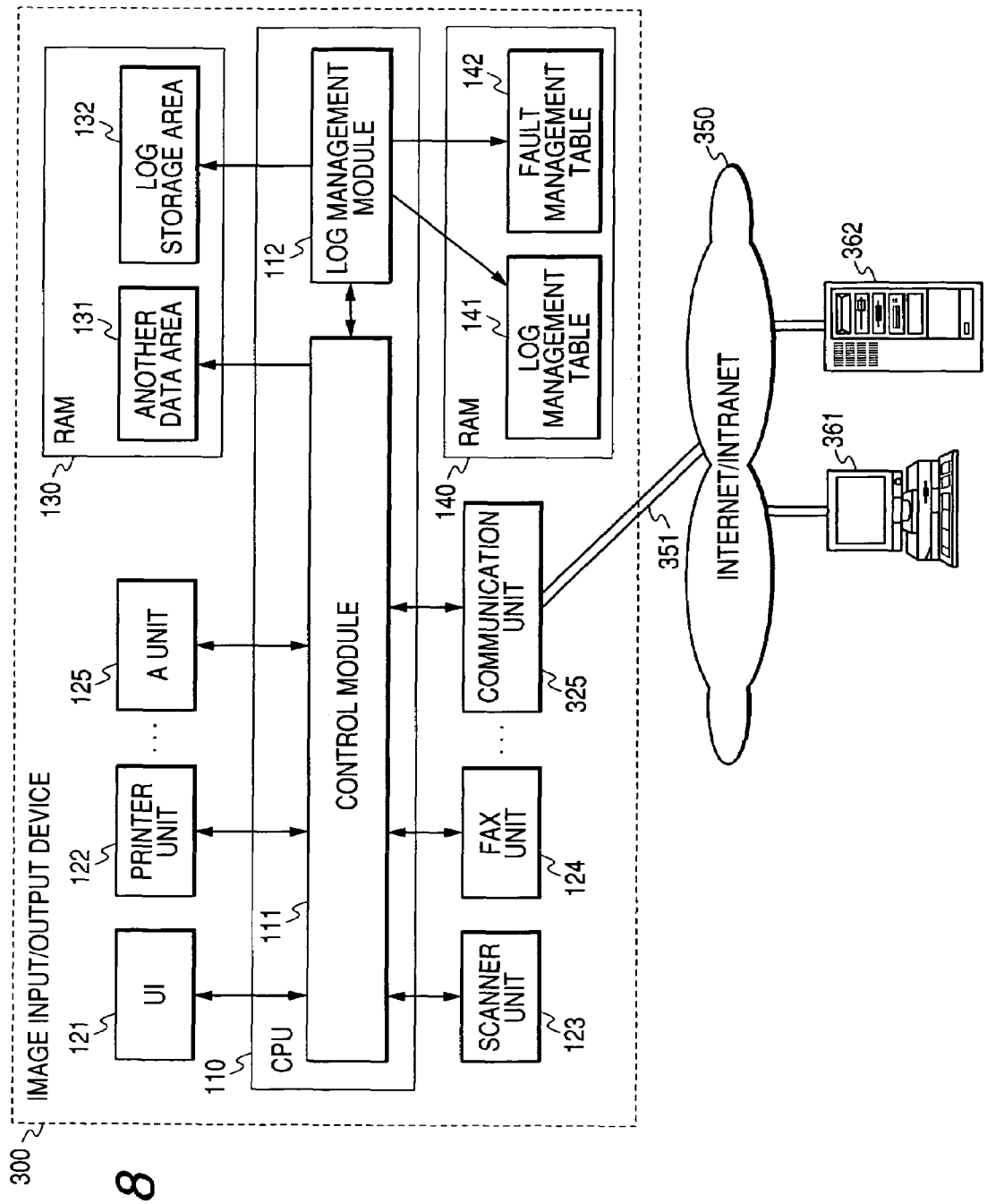
FIG. 8 is an explanatory block diagram showing a system architecture of the input input/output device in a third embodiment of the present invention.

FIG. 8 is an explanatory block diagram showing a system architecture of the image input/output device in a third embodiment of the present invention, wherein the same components as those in FIG. 1 are marked with the same numerals and symbols.

In FIG. 8, a communication unit 325 is connected via a connection medium 351 to an Internet/Intranet 350 such as the Internet and LAN (Local Area Network)/WAN (Wide Area Network), and transmits and receives the data to and from a PC 361 and a management server 362 on the network. The communication unit 325 executes a TCP/IP (Transmission Control Protocol/Internet Protocol) process by way of one example.

In an image input/output device 300 including the communication unit 325, when detecting the occurrence of the fault, only the fault-related logs are selected from the log storage area 132 in accordance with a control procedure shown in FIG. 9, which will be explained later on, and these selected logs are transmitted to a PC 361 and a management server 362 performing the fault management.

Figure 9:
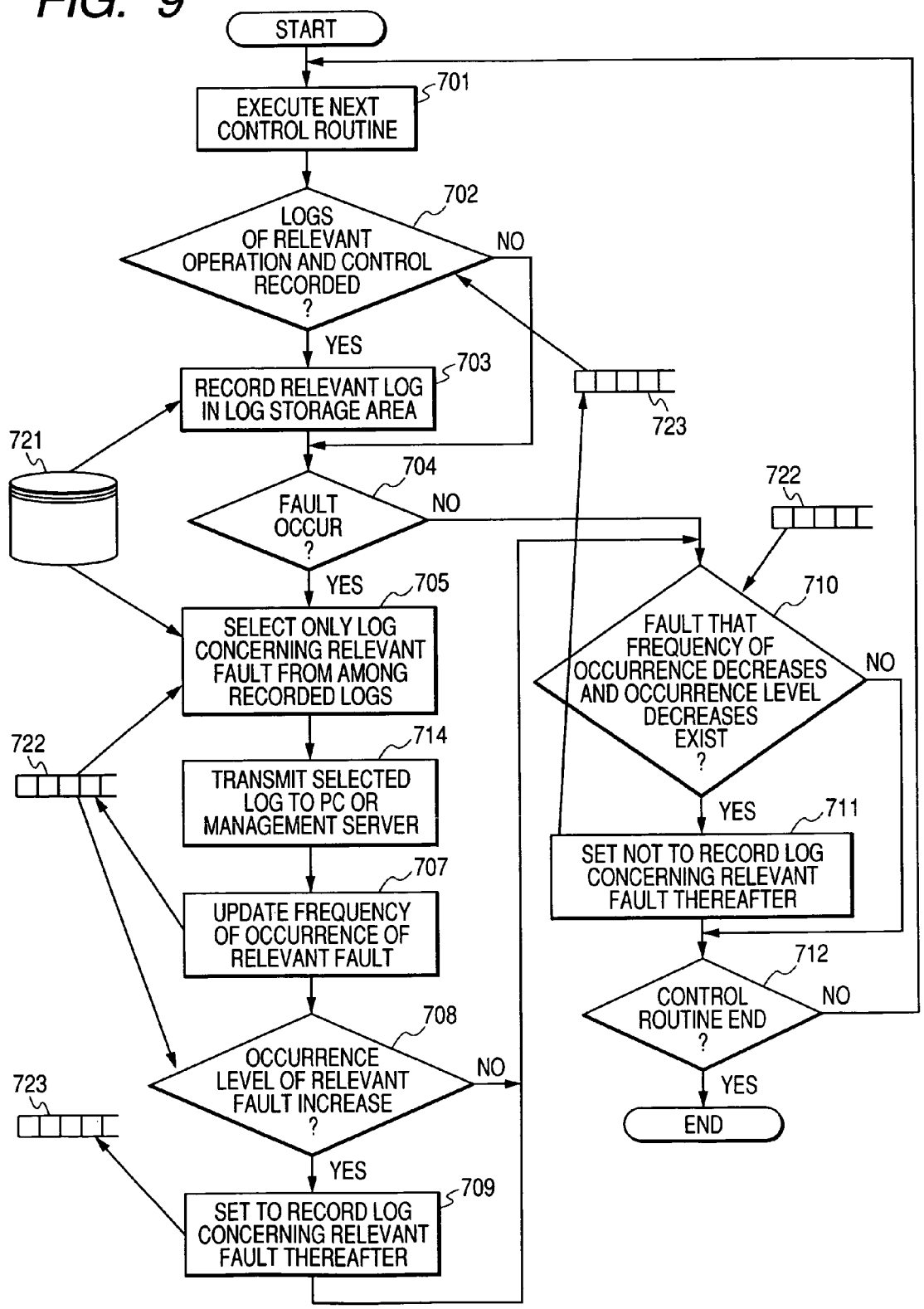
FIG. 9 is a flowchart showing one example of a third data processing procedure in the image input/output device in the third embodiment of the present invention.

FIG. 9 is a flowchart showing one example of a third data processing procedure in the image input/output device according to the present invention, and this processing procedure corresponds to the history record processing procedure of recording into the log storage area 132, which is executed by the log management module 112 shown in FIG. 8 while referring to the fault management table 142. Note that (701)-(705), (707)-(712) and (714) represent respective steps. Moreover, the CPU 110 shown in FIG. 8 executes the log management module 112, thereby actualizing these steps.

Furthermore, in FIG. 9, the log storage area 721 corresponds to the log storage area 132 shown in FIG. 8, the log management table 723 corresponds to the log management table 141, and the fault management table 722 corresponds to the fault management table 142.

FIGS. 5A, 5B and 5C are explanatory schematic diagrams each showing a history recording process into the log storage area 132, which is executed by the log management module 112 shown in FIG. 1, wherein FIG. 5A corresponds to a state before the fault occurs, FIG. 5B corresponds to a state when the fault occurs, and FIG. 5C corresponds to a state after the fault has occurred.

Throughout FIGS. 5A to 5C, the log storage area 801 corresponds to the log storage area 132 shown in FIG. 1.

To start with, when the image input/output device 300 illustrated in FIG. 8 operates, the user inputs the operational instruction or a print job, etc., whereby control routines corresponding to these events (user's inputs) in the control module 111 are consecutively executed (701).

Then, the log management module 112 judges on the control-routine-by-control-routine basis whether the logs about the user's instructive operation inputted and the control itself are recorded or not (702). The log management module 112 makes this judgment by referring to the log management table 723, and specifically the judgment is conducted based on which value, "0" or "1", is set in the record flag 503 shown in FIG. 2 as described above.

Then, in the third embodiment, in the case of recording the operation logs or the control logs, namely, in the case where the value in the concerned record flag 503 is "1", as shown in FIG. 9, the logs concerned are consecutively recorded in the log storage area 721 (703). A data flow in the processing flow described above corresponds to the state before the fault occurs as shown in FIG. 5A, and a log list 802 of the logs to be recorded is expressed as a list of the operation logs or the control logs in which the value in the record flag 503 shown in FIG. 2 is "1".

Then, the logs existing in the list 802 are, when subjected to the operation and the control by the log management module 112, invariably recorded in the log storage area 801. Note that 803 in FIGS. 5A to 5C shows one example of the logs recorded in the log storage area 801. Further, the log contents are recorded in the log 803 in a way that adds (associates) the time to (with) each log content.

Next, it is judged in the control routine whether the fault occurs or not (704), and, when it is judged that the fault does not occur, the processing advances to step (710), wherein when it is judged that the fault occurs, only the logs related to the fault are selected from within the logs recorded so far in the log storage area 721 (705).

It is to be noted that judgment about whether or not the logs recorded in the log storage area 721 are related to the fault concerned is conducted by the log management module 112 in a way that refers to the fault management table 722. To be specific, as shown in FIG. 3, the management information about the fault is specified by the fault ID 601, then only the logs specified by the log ID 501, which are registered in the items 606 and 608 of the related log ID, are selected, and the selected logs are transmitted to the PC 361 and the management server 362 on the network, which are connected to the Internet/Intranet 350 (714). Hereafter, the operation is the same as steps shown in FIG. 4, and hence its explanation is omitted.

With this processing, the PC 361 and the management server 362 on the network are stored with necessary pieces of logs related to the fault in step (714) shown in FIG. 9, then these logs are displayed by way of notification on the unillustrated UI screen, and the user recognizes the occurrence of the fault and starts a measure against the fault occurred on the image input/output device quickly and exactly.

Moreover, on the fault management table 600, there is exactly grasped a fault occurrence fluctuation state (which differs depending on a user's specification mode of the image input/output device 300) in a case where the related log rises from the item 605 of the Level 1 up to the item 607 of the Level 2 shown in FIG. 3 in accordance with the to-be-set threshold values of the occurrence frequencies of, e.g., the two faults and in a case where the related log decreases from the item 607 of the Level 2 down to the item 605 of the Level 1 shown in FIG. 3, and the record management of the fault logs can be performed by the short-time processing with a small memory capacity without interfering with the execution of other control modules because of it's being enough merely to record the minimum number of fault logs required in the log storage area 132.

Fourth Embodiment

The first embodiment has exemplified the case of grasping the timing of recording the fault log in the log storage area 132 and notifying the local PC 160 of the content thereof, however, an available configuration is that the logs with the fault occurred are converted in to a FAX data format and transmitted via the public network to a FAX and other image input/output device, and the contents of the logs can be displayed and confirmed on the UI screen by an instruction from the operation unit, etc. An embodiment thereof will hereinafter be described.

Figure 10:
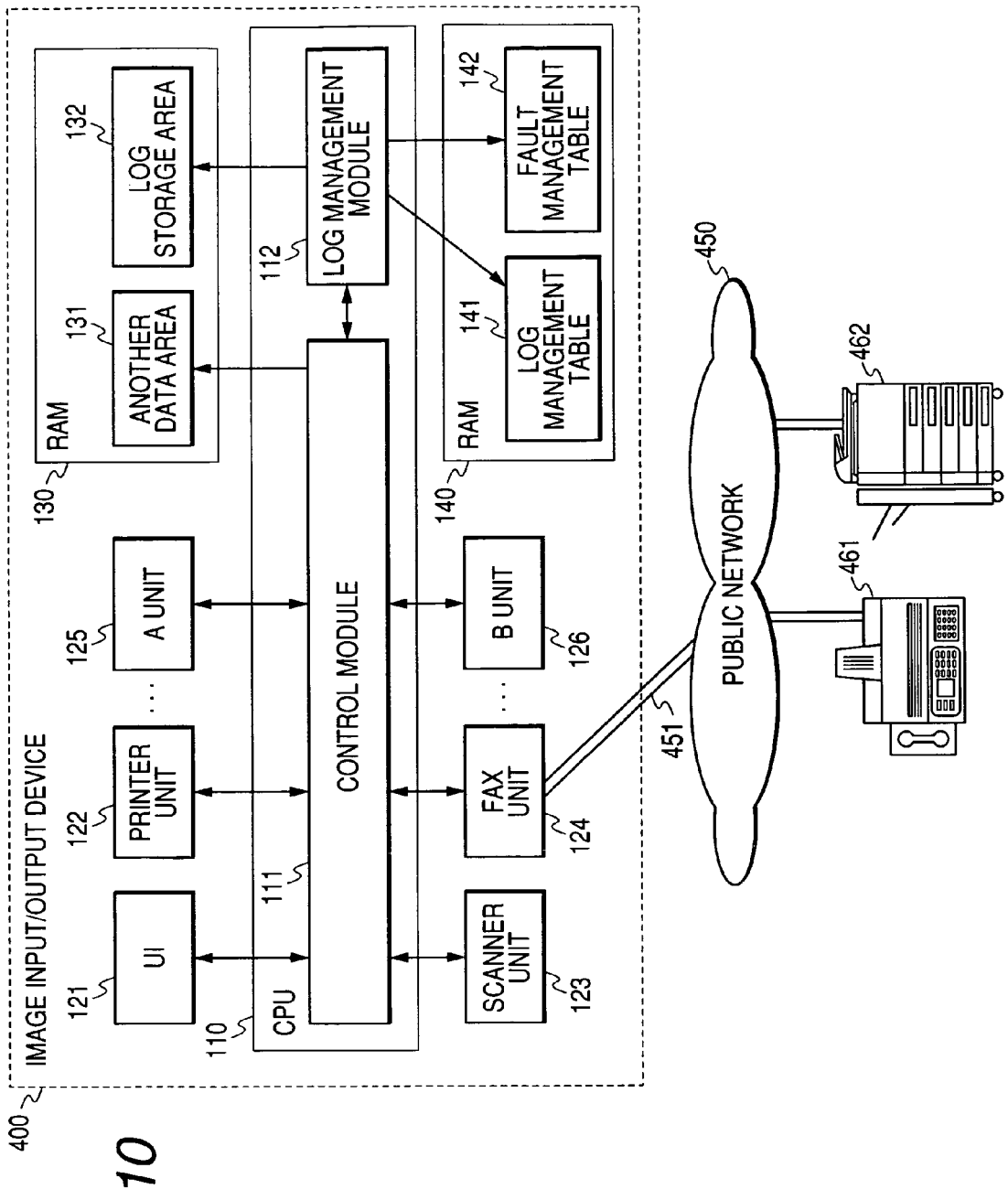
FIG. 10 is an explanatory block diagram showing a system architecture of the input input/output device in a fourth embodiment of the present invention.

FIG. 10 is an explanatory block diagram showing a system architecture of the image input/output device in a fourth embodiment of the present invention, wherein the same components as those in FIG. 1 are marked with the same numerals and symbols.

In FIG. 10, a FAX unit designated at 124 is connected via a connection medium 451 to a public network 450, and transmits the image data to a FAX 461 and an image input/output device 462 having a FAX function or receives the image data from the FAX 461 and the image input/output device 462.

In an image input/output device 400 in the fourth embodiment, when detecting the occurrence of the fault, only the fault-related logs are selected from the log storage area 132, and these selected logs are transmitted to the FAX 461 and the image input/output device 462.

FIG. 11 is a flowchart showing one example of a fourth data processing procedure in the image input/output device according to the present invention, and this processing procedure corresponds to the history record processing procedure of recording into the log storage area 132, which is executed by the log management module 112 shown in FIG. 10 while referring to the fault management table 142. Note that (701)-(705), (707)-(712) and (715) represent respective steps. Moreover, the CPU 110 shown in FIG. 1 executes the log management module 112, thereby actualizing these steps.

To start with, when the image input/output device 400 illustrated in FIG. 10 operates, the user inputs the operational instruction or a print job, etc., whereby control routines corresponding to these events (user's inputs) in the control module 111 are consecutively executed (701).

Then, the log management module 112 judges on the control-routine-by-control-routine basis whether the logs about the user's instructive operation inputted and the control itself are recorded or not (702). The log management module 112 makes this judgment by referring to the log management table 723, and specifically the judgment is conducted based on which value, "0" or "1", is set in the record flag 503 shown in FIG. 2 as described above.

Then, in the fourth embodiment, in the case of recording the operation logs or the control logs, namely, in the case where the value in the concerned record flag 503 is "1", as shown in FIG. 11, the logs concerned are consecutively recorded in the log storage area 721 (703). A data flow in the processing flow described above corresponds to the state before the fault occurs as shown in FIG. 5A, and a log list 802 of the logs to be recorded is expressed as a list of the operation logs or the control logs in which the value in the record flag 503 shown in FIG. 2 is "1".

Then, the logs existing in the list 802 are, when subjected to the operation and the control by the log management module 112, invariably recorded in the log storage area 801. Note that 803 in FIGS. 5A to 5C shows one example of the logs recorded in the log storage area 801. Further, the log contents are recorded in the log 803 in a way that adds (associates) the time to (with) each log entry.

Next, it is judged in the control routine whether the fault occurs or not (704), and, when it is judged that the fault does not occur, the processing advances to step (710), wherein when it is judged that the fault occurs, only the logs related to the fault are selected from within the logs recorded so far in the log storage area 721 (705).

It is to be noted that judgment about whether or not the logs recorded in the log storage area 721 are related to the fault concerned is conducted by the log management module 112 in a way that refers to the fault management table 722. To be specific, as shown in FIG. 3, the management information about the fault is specified by the fault ID 601, then only the logs specified by the log ID 501, which are registered in the items 606 and 608 of the related log ID, are selected, and the selected logs are transmitted to the FAX 461 and the image input/output device 462 (715). Hereafter, the operation is the same as steps shown in FIG. 4, and hence its explanation is omitted.

With this processing, the FAX 461 and the image input/output device 462 are stored with necessary pieces of logs related to the fault in step (715) shown in FIG. 11, then these logs are displayed by way of notification on the unillustrated UI screen, and the user recognizes the occurrence of the fault and starts a measure against the fault occurred on the image input/output device quickly and exactly.

Moreover, on the fault management table 600, there is exactly grasped a fault occurrence fluctuation state (which differs depending on a user's specification mode of the image input/output device 400) in a case where the related log rises from the item 605 of the Level 1 up to the item 607 of the Level 2 shown in FIG. 3 in accordance with the to-be-set threshold values of the occurrence frequencies of, e.g., the two faults and in a case where the related log decreases from the item 607 of the Level 2 down to the item 605 of the Level 1 shown in FIG. 3, and the record management of the fault logs can be performed by the short-time processing with a small memory capacity without interfering with the execution of other control modules because of it's being enough merely to record the minimum number of fault logs required in the log storage area 132.

According to the respective embodiments discussed above, it is possible to flexibly change the setting/non-setting of the various types of histories (logs) as the recording targets during the operation in accordance with the error type or the fault type and the occurrence frequency. Hence, there is obviated a futile expenditure of the history storage area on histories that are less necessary for testing and fault analysis. Further, when the error/fault occurs, only the related logs are selected, thereby facilitating the analysis of the error or the fault, which is carried out by a serviceman and a fault self-diagnosing device.

The in-depth descriptions of the embodiments of the present invention have been given so far with relation to the preferred embodiments, but the present invention may be applied to a system configured by a plurality of devices and may also be applied to an apparatus constructed of a single device.

Fifth Embodiment

A configuration of a data processing program readable by the image input/output device according to the present invention will hereinafter be explained with reference to a memory map shown in FIG. 12.

FIG. 12 is an explanatory diagram of a memory map of a storage medium for storing a variety of data processing programs readable by the image input/output device according to the present invention.

It should be noted that there might be a case in which the storage medium is also stored with, though not particularly illustrated, pieces of information such as version information, a creator, etc., for managing a program group to be stored and pieces of information such as icons, etc., for identifying and representing the programs, which depend on the OS, etc., on the program reading side.

Further, the data belonging to the variety of programs are also managed in the directory described above. Moreover, there might be a case where the storage medium is stored with a program for installing the variety of programs into the computer and with a program etc for extracting, if compressed, a compressed program to be installed.

The functions illustrated in FIGS. 4, 7, 9 and 11 in the embodiments may be implemented by a host computer through the program installed from outside. Then, in this instance, the present invention is applied also to such a case that the output device is supplied with the information group containing the programs from on the storage medium such as a CD-ROM, a flash memory, a FD, etc., or from on an external storage medium via the network.

As stated above, the system or the device is supplied with the storage medium recorded with software program codes actualizing the functions in the embodiment discussed above, and the computer (or a CPU and an MPU) of the system or the device reads and executes the program codes stored on the storage medium, whereby the object of the present invention is, as a matter of course, accomplished.

In this case, it follows that the program codes themselves, which are read from the storage medium, actualize the novel functions of the present invention and that the storage medium stored with the program codes configures the present invention.

Accordingly, the programs such as an object code, a program executed by an interpreter, script data, etc., supplied to the OS are usable irrespective of forms of the programs on condition that the functions of the programs are provided.

The storage medium for supplying the program can involve using, for example, a flexible disc, a hard disc, an optical disc, a magneto-optic disc, an MO, a CD-ROM, a CD-R, a CD-RW, a magnetic tape, a nonvolatile memory card, a ROM, a DVD and so on.

In this case, it follows that the program codes themselves, which are read from the storage medium, actualize the functions in the embodiments discussed above and that the storage medium stored with the program codes configures the present invention.

For others, as a program supply method, the program can be also supplied by linking to a homepage on the Internet by use of a browser on a client computer and downloading the computer program itself of the present invention or a file compressed and including an auto-install function into the storage medium such as the hard disc, etc., from the homepage. Further, the supply of the program can be also actualized by segmenting the program codes structuring the program of the present invention into a plurality of files and downloading the respective files from different homepages. Namely, claims according to the present invention include a WWW server, an FTP (File Transfer Protocol) server, etc., that downloads the program file actualizing the functional processing of the present invention with the computer for a plurality of users.

Moreover, it is also possible to actualize the function of the program of the present invention by encrypting this program, storing the encrypted program on the storage medium such as the CD-ROM, distributing the program to the users, permitting the user who cleared predetermined conditions to be downloaded with key information for decrypting the encrypted program from the homepage via the Internet, and installing the program into the computer by executing the encrypted program in a way that uses the key information. Furthermore, it goes without saying that there is included a case in which the functions in the embodiments discussed above are actualized by executing the program codes read by the computer, besides, the OS (Operating System), etc., running on the computer executes a part or the whole of the actual processes on the basis of the instructions of the program codes, and the functions in the embodiments discussed above are actualized by the processing thereof.

Moreover, as a matter of course, there is included such a case that after the program codes read from the storage medium have been written to a memory provided in a function extended board inserted into the computer or in a function extended unit connected to the computer, a CPU, etc., provided in the function extended board or the function extended unit executes a part or the whole of the actual processes on the basis of the instructions of the program codes, and the functions in the embodiments discussed above are actualized by the processing thereof.

The present invention is not limited to the embodiments given above and can be modified in a variety of forms (including organic combinations of the respective embodiments) based on the gist of the present invention, and these modifications are not excluded from the scope of the present invention.

The discussion has been made by exemplifying the variety of examples and the embodiments of the present invention, however, it is taken for granted to those skilled in the art that the gist and the scope of the present invention are not restricted to the specified descriptions in the present specification and include the following operative embodiments. Operative embodiments 1 through 20 will hereinafter be described.

Operative Embodiment 1

An image input/output apparatus executing an image input/output process by controlling at least one device includes a controlling unit (corresponding to the control module 111 shown in FIG. 1) adapted to control an operation of the device, a first storing unit (corresponding to the log storage area 132 shown in FIG. 1) adapted to store a history as log information (the log shown in FIG. 2) showing a state of the control by the controlling unit, a fault detecting unit (various types of unillustrated sensors are installed in predetermined positions within the image input/output apparatus, and outputs thereof are inputted to an unillustrated input port of the CPU 110) adapted to detect a fault of the device, a second storing unit (corresponding to the fault management table 142 shown in FIG. 1) adapted to store an occurrence frequency (refer to the occurrence frequency in the fault management table 600 shown in FIG. 3) of the fault detected by the fault detecting unit in a way that associates the occurrence frequency with the fault, a setting unit (corresponding to the operation panel configuring, e.g., the UI 121 shown in FIG. 1) adapted to enable one or more threshold values of the occurrence frequency to be set, a discriminating unit (corresponding to the judging function process by the log management module 112 shown in FIG. 1) adapted to judge whether or not the occurrence frequency of the fault is equal to or larger than the threshold value, and a log management unit (corresponding to a judging function process by the log management module 112 shown in FIG. 1) adapted to control storage setting of the log information associated with the fault into the first storing unit on the basis of a result of the judgment by the discriminating unit.

With this configuration, there is set the threshold value for judging the fault occurrence frequency in adaptation to an environment where the user employs the image input/output apparatus, the administrator selects a should-emphasize intrinsic fault in the individually-occurred faults from within the detectable faults, and it is enough to store the occurrence state of the fault, whereby a futile fault management processing load can be reduced, and a normal image input/output processing efficiency can be prevented from decreasing.

Operative Embodiment 2

The image input/output apparatus according to the operative embodiment 1, further includes a third storing unit (the log management table 141 shown in FIG. 1) adapted to store storage control information (the record flag 503 shown in FIG. 2) for controlling the storage setting, wherein the log management unit, based on the storage control information, stores the first storing unit selectively with the log information.

This eliminates the necessity of previously providing the storing unit for storing all the logs, and makes it possible to build up a low-cost system capable of the storage management of the necessary fault information by using a small-capacity memory.

Operative Embodiment 3

In the image input/output apparatus according to the operative embodiment 1, the log management unit notifies an external apparatus of the log information stored on the first storing unit.

This enables the external apparatus to detect the required history about the fault occurred by notifying the external apparatus of the selected and stored fault information required.

Operative Embodiment 4

In the image input/output apparatus according to the operative embodiment 1, the log management unit stores a fourth storing unit with the log information stored on the first storing unit.

With this contrivance, the external storage device can be stored with the selected and stored fault information required.

Operative Embodiment 5

In the image input/output apparatus according to the operative embodiment 3, the external apparatus is a data processing apparatus or a management server apparatus communicable via a predetermined communication medium.

With this configuration, the data processing apparatus or the management server apparatus serving as the external apparatus is notified of the selected and stored fault information required via the communication medium such as a network, and the data processing apparatus or the management server apparatus can verify the necessary history about the fault occurred.

Operative Embodiment 6

In the image input/output apparatus according to the operative embodiment 3, the log management unit selects the log information related to the fault that is stored on the second storing unit from within the log information stored on the first storing unit and notifies the external apparatus of the fault-related log information (step (706) shown in FIG. 4).

The external apparatus is notified of only the necessary fault information and can verify only the selected necessary history about the fault occurred.

Operative Embodiment 7

In the image input/output apparatus according to the operative embodiment 1, the second storing unit (corresponding to the fault management table 142 shown in FIG. 1) further stores the threshold value of the occurrence frequency so that the threshold value can be updated.

This makes it possible to judge the fault occurrence frequency by setting the threshold value for judging the fault occurrence frequency without any restriction in adaptation to the environment where the user employs the image input/output apparatus.

Operative Embodiment 8

In the image input/output apparatus according to the operative embodiment 1, when the discriminating unit judges that the fault occurrence frequency fluctuates from a count (the number of times) less than the threshold value to a count equal to or larger than the threshold value (a discriminating step in step (708) shown in FIGS. 4, 7, 9 and 11), the log management unit controls the log information related to the fault so that the fault-related log information is stored on the first storing unit.

With this scheme, it is feasible to surely store the history about a minimum number of faults required, even when the fault occurrence frequency fluctuates due to the using state of the image input/output apparatus while making the fault judgment adapted to this fluctuation state. Further, it is also possible to select the should-store history in relation to the fault from within the log information and to restrain a capacity for the log information that should be stored on the first storing unit.

Operative Embodiment 9

In the image input/output apparatus according to the operative embodiment 1, when the discriminating unit judges that the fault occurrence frequency fluctuates from a count (the number of times) equal to or larger than the threshold value to a count less than the threshold value (a discriminating step in step (710) shown in FIGS. 4, 7, 9 and 11), the log management unit controls the log information related to the fault so that the fault-related log information is not stored on the first storing unit.

With this scheme, it is feasible reliably to store the history about a minimum number of faults required, even when the fault occurrence frequency fluctuates due to the using state of the image input/output apparatus while making the fault judgment adapted to this fluctuation state. Further, if the fault occurrence frequency decreases, it is feasible to exclude the history information from the history that should be stored, and to restrain a capacity for the log information that should be stored on the third storing unit.

Operative Embodiment 10

The image input/output apparatus according to the operative embodiment 1, further includes a timer unit (an internal timer (not shown) of the CPU 110 shown in FIG. 1) adapted to measure the time, wherein the log management unit, after the fault has occurred, if the same fault does not occur for a predetermined period of elapse measured by the timer unit, updates the occurrence frequency associated with the fault stored on the second storing unit to a decremented value (step (707) shown in FIGS. 4, 7, 9 and 11).

With this contrivance, even when a state of the fault fluctuates, the necessary history is selected in adaptation to this fluctuation and can be thus stored.

Operative Embodiment 11

The image input/output apparatus according to the operative embodiment 1, further includes a timer unit (an internal timer (not shown) of the CPU 110 shown in FIG. 1) adapted to measure the time, wherein the second storing unit stores the fault occurrence frequency together with the time measured by the timer unit.

With this contrivance, a log state of the history information stored on the second storing unit is accurately calculated, and, if the predetermined period of time elapses and the fault state fluctuates, the necessary history is selected in adaptation to the elapse time and can be thus stored.

Operative Embodiment 12

An information processing method of an image input/output apparatus executing an image input/output process by controlling at least one device and including a controlling unit adapted to control an operation of the device, includes a first storing step (step (703) shown in FIGS. 4, 7, 9 and 11) of storing a first storing unit with a history as log information showing a state of the control by the controlling unit, a fault detecting step (step (704) shown in FIGS. 4, 7, 9 and 11) of detecting a fault of the device, a second storing step (step (707) shown in FIGS. 4, 7, 9 and 11) of storing an occurrence frequency of the fault detected in the fault detecting step in a way that associates the occurrence frequency with the fault, a setting step (not shown) capable of setting one or more threshold values of the occurrence frequency, a discriminating step (steps (703) and (710) shown in FIGS. 4, 7, 9 and 11) of judging whether or not the occurrence frequency of the fault is equal to or larger than the threshold value, and a log management step (steps (709) and (711) shown in FIGS. 4, 7, 9 and 11) of controlling storage setting of the log information associated with the fault into the first storing unit on the basis of a result of the judgment in the discriminating step.

Owing to this method, the same effects as those in the operative embodiment 1 are exhibited.

The present invention exhibits an effect in performing the fault information management having excellent usability, wherein an administrator selects an intrinsic fault that should be emphasized from among the detectable individually-occurred faults while setting without any restriction the threshold value for judging the fault occurrence frequency in adaptation to an environment in which the user employs the image input/output apparatus, thereby making it possible to reduce a futile fault management processing load and to prevent a normal image input/output processing efficiency from decreasing because of it's being enough to store the fault occurrence state.

As many apparently widely different embodiments of the present invention can be made without departing from the spirit and scope thereof, it is to be understood that the invention is not limited to the specific embodiments thereof except as defined in the appended claims.

This application claims priority from Japanese Patent Application No. 2004-246240, filed Aug. 26, 2004, which is hereby incorporated by reference herein.

What is claimed is:

1. An image input/output apparatus executing an image input/output process and comprising:
   a first storing unit adapted to store log information representing an internal state of the image input/output apparatus during an execution of the image input/output process;
   a fault detecting unit adapted to detect a fault occurring during the execution of the image input/output process;

a second storing unit adapted to store an occurrence frequency of the fault detected by said fault detecting unit in a way that associates the occurrence frequency with the fault;

a determining unit adapted to determine whether or not the occurrence frequency of the fault is equal to or larger than a threshold value; and a log management unit adapted to control the storage setting for fault-related log information representing an internal state of the image input/output apparatus on the basis of a determining result produced by said determining unit and selectively store the fault-related log information in said first storing unit on the basis of the storage setting, wherein, when said determining unit determines that the fault occurrence frequency fluctuates from a count (a number of times) less than the threshold value to a count equal to or larger than the threshold value, said log management unit changes the storage setting to storing the fault-related log information with regard to the image input/output process to be executed next.

2. An image input/output apparatus according to claim 1, wherein said log management unit notifies an external apparatus of the log information stored in said first storing unit.

3. An image input/output apparatus according to claim 1, wherein said log management unit stores the log information stored in said first storing unit in a third storing unit.

4. An image input/output apparatus according to claim 2, wherein the external apparatus is a data processing apparatus or a management server apparatus with which communication is possible via a predetermined communication medium.

5. An image input/output apparatus according to claim 2, wherein said log management unit selects the fault-related log information from within the log information stored in said first storing unit and notifies the external apparatus of the fault-related log information.

6. An image input/output apparatus according to claim 1, wherein said second storing unit further stores the threshold value of the occurrence frequency so that the threshold value can be updated.

7. An image input/output apparatus according to claim 1, further comprising a timer unit adapted to measure the time, wherein said log management unit, after the fault has occurred, and if the same fault does not recur for a predetermined period of elapse measured by said timer unit, updates the occurrence frequency associated with the fault stored in said second storing unit to a decremented value.

8. An image input/output apparatus according to claim 1, further comprising a timer unit adapted to measure the time, wherein said second storing unit stores the fault occurrence frequency together with the time measured by said timer unit.

9. An information processing method of an image input/output apparatus executing an image input/output process and comprising:

a first storing step of storing in a first storing unit log information representing an internal state of the image input/output apparatus during an execution of the image input/output process;

a fault detecting step of detecting a fault occurring during the execution of the image input/output process;

a second storing step of storing an occurrence frequency of the fault detected in said fault detecting step in a way that associates the occurrence frequency with the fault;

a discriminating step of judging whether or not the occurrence frequency of the fault is equal to or larger than a threshold value; and a log management step of controlling the storage setting for fault-related log information representing an internal state of the image input/output apparatus on the basis of a determining result produced in said determining step and selectively storing the fault-related log information on the basis of the storage setting, wherein, when it is determined in said determining step that the fault occurrence frequency fluctuates from a count (a number of times) less than the threshold value to a count equal to or larger than the threshold value, said log management step involves changing the storage setting to storing the fault-related log information with regard to the image input/output process to be executed next.

10. An information processing method according to claim 9, wherein said log management step involves notifying an external apparatus of the log information stored in the first storing unit.

11. An information processing method according to claim 9, wherein said log management step involves storing the log information stored in the first storing unit in a third storing unit.

12. An information processing method according to claim 10, wherein the external apparatus is a data processing apparatus or a management server apparatus with which communication is possible via a predetermined communication medium.

13. An information processing method according to claim 10, wherein said log management step involves selecting the fault-related log information from within the log information stored in the first storing unit and notifying the external apparatus of the fault-related log information.

14. An information processing method according to claim 9, wherein said second storing step involves further storing the threshold value of the occurrence frequency so that the threshold value can be updated.

15. An information processing method according to claim 9, wherein said log management step, after the fault has occurred, and if the same fault does not occur for a predetermined period of elapse measured by a timer unit, involves updating the occurrence frequency associated with the fault stored in the second storing unit to a decremented value.

16. An information processing method according to claim 9, wherein said second storing step involves storing the fault occurrence frequency together with the time measured by a timer unit.

17. A computer-readable storage medium storing a program for causing a computer to execute an information processing method of an image input/output apparatus executing an image input/output process, said method comprising:

a first storing step of storing in a first storing unit log information representing an internal state of the image input/output apparatus during an execution of the image input/output process;

a fault detecting step of detecting a fault occurring during the execution of the image input/output process;

a second storing step of storing an occurrence frequency of the fault detected in said fault detecting step in a way that associates the occurrence frequency with the fault;

a discriminating step of judging whether or not the occurrence frequency of the fault is equal to or larger than a threshold value; and a log management step of controlling the storage setting for fault-related log information representing an internal state of the image input/output apparatus on the basis of a determining result obtained in said determining step and selectively storing the fault-related log information on the basis of the storage setting, wherein, when it is determined in said determining step that the fault occurrence frequency fluctuates from a count (a number of times) less than the threshold value to a count equal to or larger than the threshold value, said log management step involves changing the storage setting to storing the fault-related log information with regard to the image input/output process to be executed next.

18. An image input/output apparatus executing an image input/output process and comprising:

a first storing unit adapted to store a history as log information representing an internal state of the image input/output apparatus during an execution of the image input/output process;

a fault detecting unit adapted to detect a fault occurring during the execution of the image input/output process;

a second storing unit adapted to store an occurrence frequency of the fault detected by said fault detecting unit in a way that associates the occurrence frequency with the fault;

a determining unit adapted to determine whether or not the occurrence frequency of the fault is equal to or larger than a threshold value; and a log management unit adapted to control the storage setting for fault-related log information representing an internal state of the image input/output apparatus on the basis of a determining result produced by said determining unit and selectively store the fault-related log information in said first storing unit on the basis of the storage setting, wherein, when said determining unit determines that the fault occurrence frequency fluctuates from a count (a number of times) equal to or larger than the threshold value to a count less than the threshold value, said log management unit changes the storage setting to not storing the fault-related log information with regard to the image input/output process to be executed next.

19. An image input/output apparatus according to claim 18, wherein said log management unit notifies an external apparatus of the log information stored in said first storing unit.

20. An image input/output apparatus according to claim 18, wherein said log management unit stores the log information stored in said first storing unit in a third storing unit.

21. An image input/output apparatus according to claim 19, wherein the external apparatus is a data processing apparatus or a management server apparatus with which communication is possible via a predetermined communication medium.

22. An image input/output apparatus according to claim 19, wherein said log management unit selects the fault-related log information from within the log information stored in said first storing unit and notifies the external apparatus of the fault-related log information.

23. An image input/output apparatus according to claim 18, wherein said second storing unit further stores the threshold value of the occurrence frequency so that the threshold value can be updated.

24. An image input/output apparatus according to claim 18, further comprising a timer unit adapted to measure the time, wherein said log management unit, after the fault has occurred, and if the same fault does not recur for a predetermined period of elapse measured by said timer unit, updates the occurrence frequency associated with the fault stored in said second storing unit to a decremented value.

25. An image input/output apparatus according to claim 18, further comprising a timer unit adapted to measure the time, wherein said second storing unit stores the fault occurrence frequency together with the time measured by said timer unit.

26. An information processing method of an image input/output apparatus executing an image input/output process and comprising:

a first storing step of storing in a first storing unit log information representing an internal state of the image input/output apparatus during an execution of the image input/output process;

a fault detecting step of detecting a fault occurring during the execution of the image input/output process;

a second storing step of storing an occurrence frequency of the fault detected in said fault detecting step in a way that associates the occurrence frequency with the fault;

a discriminating step of judging whether or not the occurrence frequency of the fault is equal to or larger than a threshold value; and a log management step of controlling the storage setting for fault-related log information representing an internal state of the image input/output apparatus on the basis of a determining result produced in said determining step and selectively storing the fault-related log information on the basis of the storage setting, wherein, when it is judged in said discriminating step that the fault occurrence frequency fluctuates from a count (a number of times) equal to or larger than the threshold value to a count less than the threshold value, said log management step involves changing the storage setting to not storing the fault-related log information with regard to the image input/output process to be executed next.

27. An information processing method according to claim 26, wherein said log management step involves notifying an external apparatus of the log information stored in the first storing unit.

28. An information processing method according to claim 26, wherein said log management step involves storing the log information stored in the first storing unit in a third storing unit.

29. An information processing method according to claim 27, wherein the external apparatus is a data processing apparatus or a management server apparatus with which communication is possible via a predetermined communication medium.

30. An information processing method according to claim 27, wherein said log management step involves selecting the fault-related log information from within the log information stored in the first storing unit and notifying the external apparatus of the fault-related log information.

31. An information processing method according to claim 26, wherein said second storing step involves further storing the threshold value of the occurrence frequency so that the threshold value can be updated.

32. An information processing method according to claim 26, wherein said log management step, after the fault has occurred, and if the same fault does not occur for a predetermined period of elapse measured by a timer unit, involves updating the occurrence frequency associated with the fault stored in the second storing unit to a decremented value.

33. An information processing method according to claim 26, wherein said second storing step involves storing the fault occurrence frequency together with the time measured by a timer unit.

34. A computer-readable storage medium storing a program for causing a computer to execute an information processing method of an image input/output apparatus executing an image input/output process, said method comprising:

- a first storing step of storing in a first storing unit log information representing an internal state of the image input/output apparatus during an execution of the image input/output process;
- a fault detecting step of detecting a fault occurring during the execution of the image input/output process;
- a second storing step of storing an occurrence frequency of the fault detected in said fault detecting step in a way that associates the occurrence frequency with the fault;
- a discriminating step of judging whether or not the occurrence frequency of the fault is equal to or larger than a threshold value; and
- a log management step of controlling the storage setting for fault-related log information representing an internal state of the image input/output apparatus on the basis of a determining result produced in said determining step and selectively storing the fault-related log information on the basis of the storage setting, wherein, when it is judged in said discriminating step that the fault occurrence frequency fluctuates from a count (a number of times) equal to or larger than the threshold value to a count less than the threshold value, said log management step involves changing the storage setting to not storing the fault-related log information with regard to the image input/output process to be executed next.

* * * * *